(12) United States Patent
Miki et al.

(10) Patent No.: US 8,314,970 B2
(45) Date of Patent: Nov. 20, 2012

(54) IMAGE PROCESSING APPARATUS, IMAGE PROCESSING METHOD, IMAGE FORMING APPARATUS, IMAGE FORMING METHOD, AND RECORDED MATERIAL

(75) Inventors: Takeo Miki, Machida (JP); Takashi Yamaguchi, Kawasaki (JP); Kenji Miyazaki, Komae (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1073 days.

(21) Appl. No.: 12/163,041

(22) Filed: Jun. 27, 2008

(65) Prior Publication Data
US 2009/0002736 A1  Jan. 1, 2009

(30) Foreign Application Priority Data

Jun. 27, 2007 (JP) .................................. 2007-169416
Sep. 26, 2007 (JP) .................................. 2007-249752

(51) Int. Cl.
*H04N 1/405* (2006.01)
(52) U.S. Cl. ........................................ 358/2.1; 358/500
(58) Field of Classification Search .................. 358/1.9, 358/2.1, 3.28, 3.06, 3.2, 500, 504, 515, 517, 358/530
See application file for complete search history.

(56) References Cited

U.S. PATENT DOCUMENTS

| 6,384,935 | B1 | 5/2002 | Yamazaki |
| 6,763,122 | B1 | 7/2004 | Rodriguez et al. |
| 6,883,982 | B2 * | 4/2005 | Tokuda et al. ................... 400/76 |

FOREIGN PATENT DOCUMENTS

| DE | 199 00 856 A1 | 7/1999 |
| EP | 1 471 722 | 10/2004 |
| JP | 09-248935 | 9/1997 |
| JP | 11-27531 | 1/1999 |
| JP | 2001-268346 | 9/2001 |
| JP | 2004-328217 | 11/2004 |
| JP | 2004-343712 | 12/2004 |

OTHER PUBLICATIONS

European Search Report dated Aug. 6, 2008 for Appln. No. 08158786.7-1522.
Japanese Office Action dated Jan. 24, 2012.

* cited by examiner

*Primary Examiner* — Thomas D Lee
*Assistant Examiner* — Stephen M Brinich
(74) *Attorney, Agent, or Firm* — Pillsbury Winthrop Shaw Pittman, LLP

(57) ABSTRACT

An image processing apparatus according to an embodiment of the invention, includes an image input unit which inputs main image information defined by first, second and third color component information corresponding to at least three colors, a modulation unit which modulates a color difference grid pattern by sub information, a superposing unit which superposes the modulated color difference grid pattern on each of the first, second and third color component information after the modulated color difference grid pattern and each of the first, second and third color component information are rotated relative to each other through a predetermined angle, and a composition unit which composites the first, second and third color component information to generate color image information.

10 Claims, 19 Drawing Sheets

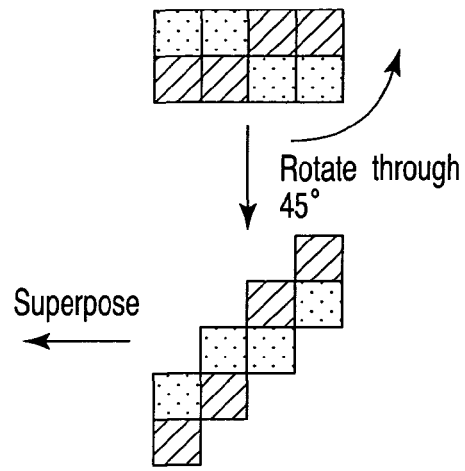
FIG. 8B
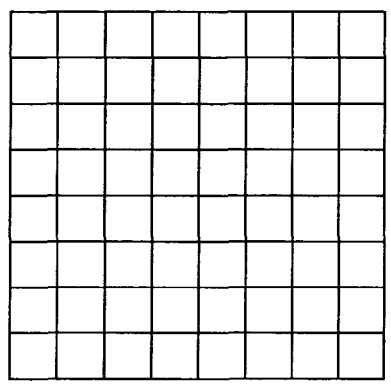
Superpose
FIG. 8A
FIG. 8C
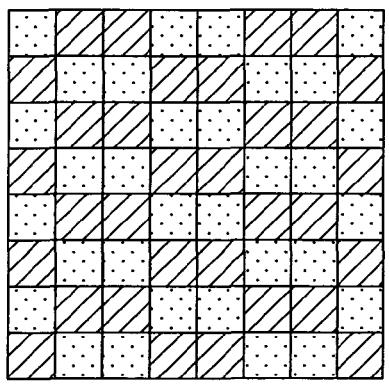
FIG. 8D

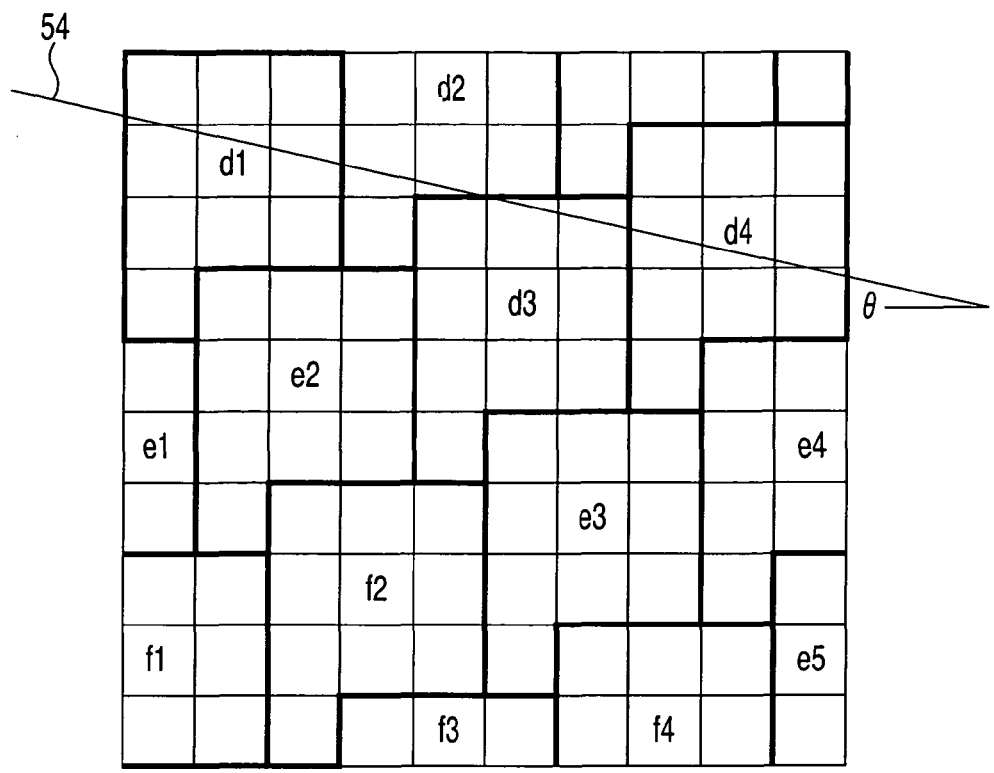
F I G. 2 3
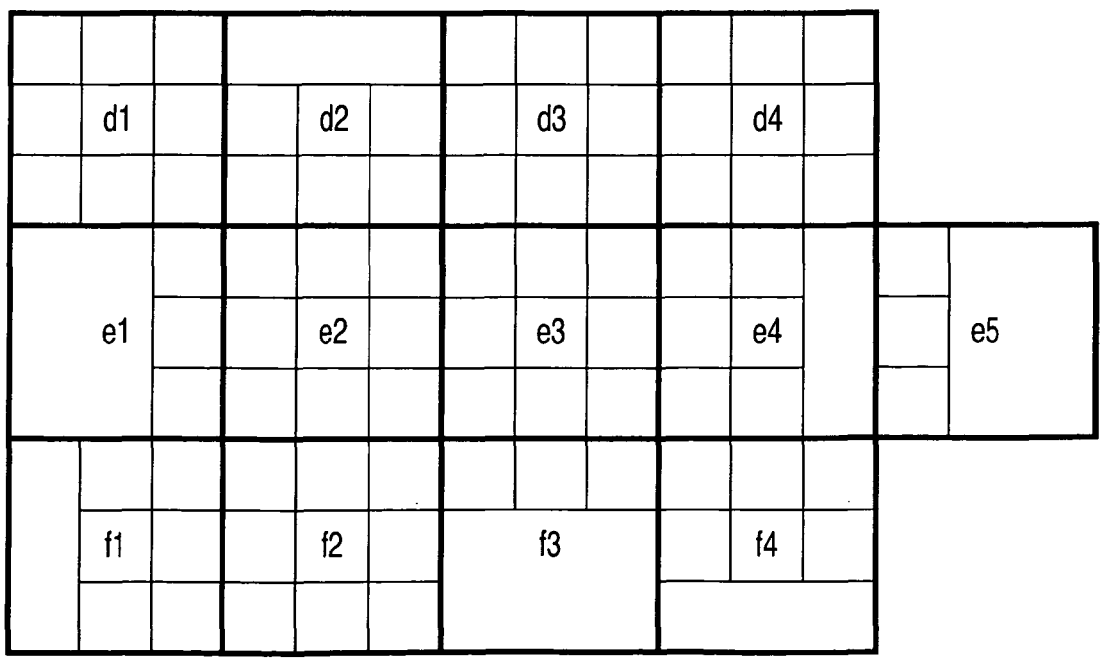
F I G. 2 4

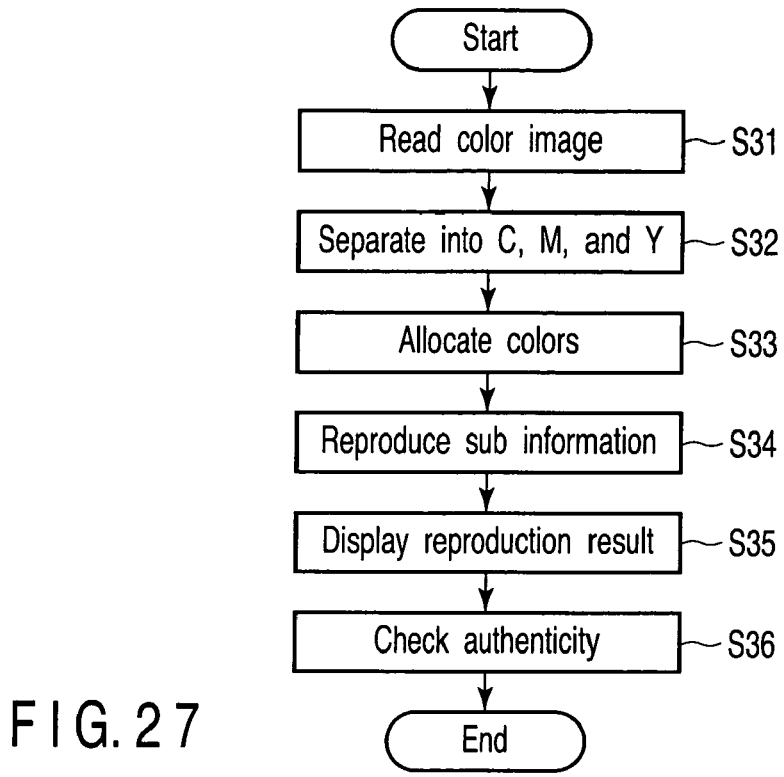
F I G. 27
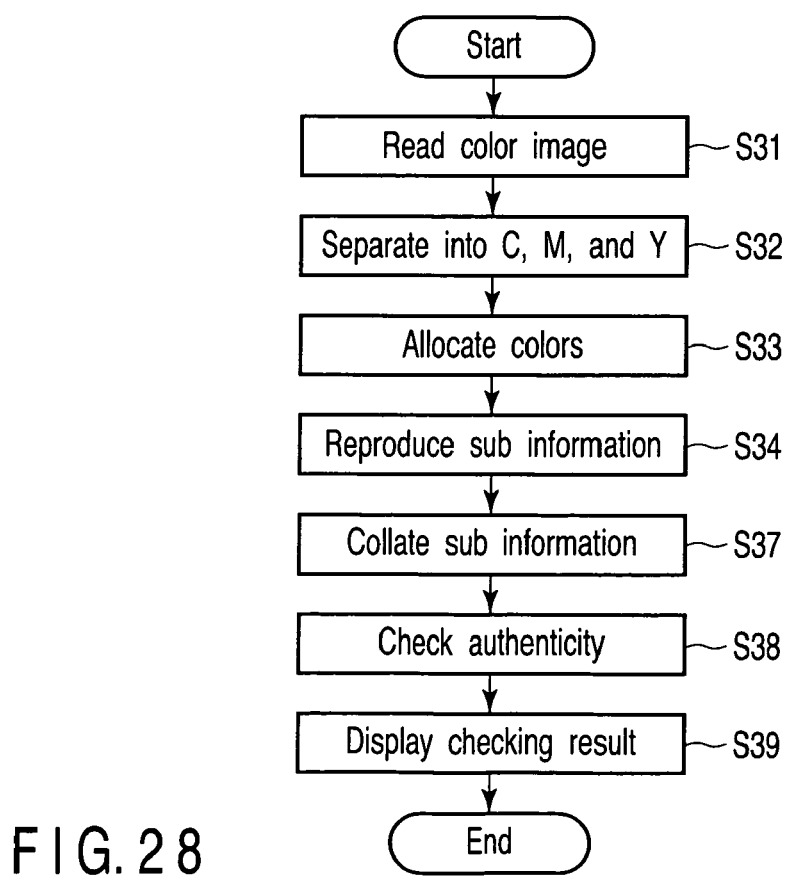
F I G. 28

IMAGE PROCESSING APPARATUS, IMAGE PROCESSING METHOD, IMAGE FORMING APPARATUS, IMAGE FORMING METHOD, AND RECORDED MATERIAL

CROSS-REFERENCE TO RELATED APPLICATIONS

This application is based upon and claims the benefit of priority from prior Japanese Patent Applications No. 2007-169416, filed Jun. 27, 2007; and No. 2007-249752, filed Sep. 26, 2007, the entire contents of both of which are incorporated herein by reference.

BACKGROUND OF THE INVENTION

1. Field of the Invention

The invention relates to an image processing apparatus and image processing method for, for example, superposing another additional sub information (security information or the like) on color image information (a human face image or the like) as main information.

The invention also relates to an image forming apparatus and image forming method for forming color image information, on which sub information is superposed using the image processing apparatus and image processing method, on a recorded material.

Furthermore, the invention relates to a recorded material created using the image processing apparatus and image processing method.

Moreover, the invention relates to an image processing apparatus and image processing method for reproducing sub information from a recorded material created using the image processing apparatus and image processing method.

2. Description of the Related Art

In recent years, along with digitization of information and prevalence of the Internet, techniques such as a digital watermark, digital signature, and the like have gained recognition so as to prevent forgery and falsification of images. The digital watermark technique embeds additional sub information (sub image information) in main information (main image information) in an invisible state. This digital watermark technique has been proposed as measures against illicit copy, forgery, and falsification of personal authentication media such as ID cards and the like, and photos embedded with copyright information.

For example, Jpn. Pat. Appln. KOKAI Publication No. 9-248935 has proposed a digital watermark insertion method which embeds data in image data to be output to a printing material using the characteristics of high spatial frequency components and color difference components, which are hard to be perceived by humans.

Also, Jpn. Pat. Appln. KOKAI Publication No. 2001-268346 has proposed a printing apparatus of a digital watermark which can be confirmed by an optical filter.

These digital watermark embedding processing methods can embed sub information (sub image information) in main information in an invisible state without any deterioration of image quality using:

(1) human visual characteristics tone discrimination capability lowers with increasing frequency of an image color difference information is harder to discriminate than luminance information (2) complementary color relationship example: red+cyan=achromatic color (white) (in case of additive color mixing)

(3) high-frequency carrier pattern image+complementary color relationship and color difference information As the example of (2), red and cyan (=green+blue) have a complementary color relationship in case of additive color mixing, and even neighboring red and cyan are hardly discriminated by the human eye and are observed as an achromatic color.

As in the example of (3), a high-frequency carrier pattern image is formed by a color difference grid pattern on which red- and cyan-rich pixels are repetitively allocated, and which exploits the human visual characteristics like that their delicate color difference cannot be discriminated by the human eye and the color difference amount is determined to come out even.

If authenticity determination of a recorded material on which an image is recorded by applying the aforementioned digital watermark technique is required, sub information recorded on the recorded material is reproduced using key information, and the authenticity is determined based on the reproduction result of the sub information, as described in the above two references.

More specifically, an input device such as a scanner, camera, or the like reads composite image information embedded with sub information as color difference information. Next, an image processor reproduces the sub information from the composite image information using a digital filter having frequency components according to specific frequency information of key information, and then checks authenticity based on the reproduction result.

However, the aforementioned technique suffers the following problems. That is, an electrophotography method is adapted as the recording method for a general digital copying machine and the like. The electrophotography method allows fast printing that can record even color images at several ten ppm or more. The electrophotography method forms a color image using four color toners, i.e., yellow, magenta, cyan, and black. Upon forming a color image using these four colors, subtractive color mixing that expresses a color image by superposing pixels of respective colors can be used. However, it is difficult in case of fast printing to accurately superpose respective color pixels. If respective pixels are not accurately superposed, color misregistration occurs.

To solve this problem, for example, the following method is known. That is, the arranging direction of a plurality of magenta pixels, that of a plurality of cyan pixels, and that of a plurality of black pixels are given tilts of different angles with respect to that of a plurality of yellow pixels. Then, these pluralities of yellow, magenta, cyan, and black pixels are composited to express a color image. As a result, a color image can be formed without accurately superposing inks. Hence, color misregistration upon deviation of pixels can be prevented.

However, the arranging direction of a plurality of pixels which form the color difference grid pattern does not correspond to those of the pluralities of magenta, cyan, and black pixels. Hence, when this color difference grid pattern is modulated by sub information, and color image information superposed with the modulated color difference grid pattern is printed by the electrophotography method, the color difference grid pattern is disturbed. That is, the sub information cannot be appropriately superposed on the color image information.

By contrast, Jpn. Pat. Appln. KOKAI Publication No. 2004-328217 has proposed a method of superposing a color difference grid pattern modulated by sub information on main information formed by alternate driving that alternately forms pixels for respective recording lines. This reference discloses a method in which after sub information is embedded in respective pieces of RGB image information, which have a tilt of a predetermined angle in a predetermined direction, the respective pieces of RGB image information embedded with the sub information are given a tilt of a predetermined angle in a direction opposite to the predetermined direction so as to alternately form pixels for respective recording lines. However, with this method, all R, G, and B colors have a common tilt angle, and pixels are formed by alternate driving. For this reason, this method cannot solve the aforementioned problem in a screening method in which the arrangement directions of pluralities of color pixels are different.

BRIEF SUMMARY OF THE INVENTION

It is therefore an object of the invention to provide an image processing apparatus and image processing method, which can appropriate superpose main information and sub information in color image formation using a screening method.

It is another object of the invention to provide an image forming apparatus and image forming method, which can generate a superposed image by appropriately superposing main information and sub information in color image formation using a screening method.

It is still another object of the invention to provide a recorded material which records a superposed image formed by appropriately superposing main information and sub information in color image formation using a screening method.

It is yet another object of the invention to provide an image processing apparatus and image processing method, which can correctly reproduce sub information from a printing material which records a superposed image formed by appropriately superposing main information and sub information in color image formation using a screening method.

An image processing apparatus according to an embodiment of the invention comprises image input means for inputting main image information defined by first, second and third color component information corresponding to at least three colors, modulation means for modulating a color difference grid pattern by sub information, superposing means for to superposing the modulated color difference grid pattern on each of the first, second and third color component information after the modulated color difference grid pattern and each of the first, second and third color component information are rotated relative to each other through a predetermined angle, and composition means for compositing the first, second and third color component information superposed with the modulated color difference grid pattern to generate color image information.

An image processing method according to an embodiment of the invention comprises inputting main image information defined by first, second and third color component information corresponding to at least three colors, rotating a color difference grid pattern modulated by sub information and each of the first, second and third color component information relative to each other through a predetermined angle, and then superposing the modulated color difference grid pattern on each of the first, second and third color component information, and compositing the first, second and third color component information superposed with the modulated color difference grid pattern to generate color image information.

A recorded material according to an embodiment of the invention comprises color image information, the color image information being information generated by rotating a color difference grid pattern modulated by sub information and each of first, second and third color component information, which define main image information and correspond to at least three colors, relative to each other through a predetermined angle, and then superposing the modulated color difference grid pattern on each of the first, second and third color component information, and compositing the first, second and third color component information superposed with the modulated color difference grid pattern to generate color image information.

An image processing apparatus according to an embodiment of the invention processes color image information, the apparatus comprises reading means for reading the color image information from a recorded material on which the color image information is recorded, color separation means for separating first, second and third color component information from the color image information, individual color rotation means for rotating the first, second and third color component information through predetermined angles, and sub information extraction means for extracting the sub information from the rotated first, second and third color component information based on the color difference grid pattern.

An image processing method according to an embodiment of the invention processes color image information, the image processing method comprises reading the color image information from a recorded material on which the color image information is recorded, separating first, second and third color component information from the color image information, rotating the first, second and third color component information through predetermined angles, and extracting the sub information from the rotated first, second and third color component information based on the color difference grid pattern.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 8A to 8D are views for explaining another processing for superposing sub information on each color component information;

FIG. 23 is a view showing an example of a pixel array of an image according to the second embodiment;

FIG. 24 is a view showing an example of a pixel array allocated by individual color allocation processing according to the second embodiment;

FIG. 27 is a flowchart for explaining the overall processing operation of an image processing system which reproduces sub information from a recorded material according to the second embodiment;

FIG. 28 is a flowchart for explaining another example of the overall processing operation of the image processing system which reproduces sub information from a recorded material according to the second embodiment;

DETAILED DESCRIPTION OF THE INVENTION

Respective embodiments will be described hereinafter with reference to the accompanying drawing.

Initially, first and second color image expression methods for expressing a color image by tilting pixel forming directions of respective colors through predetermined angles will be described.

Figure 29:
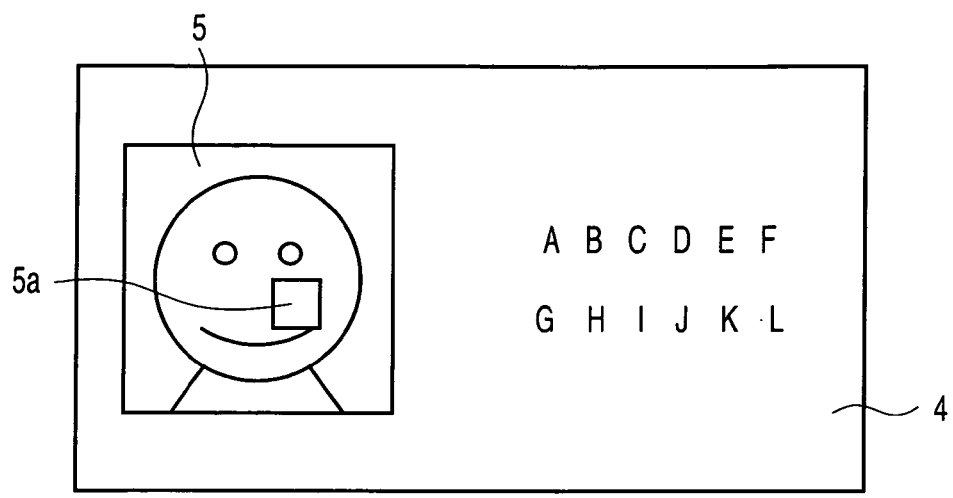
FIG. 29 is a view showing an example of a color image formed on a recording medium by an electrophotography method.
Figure 30:
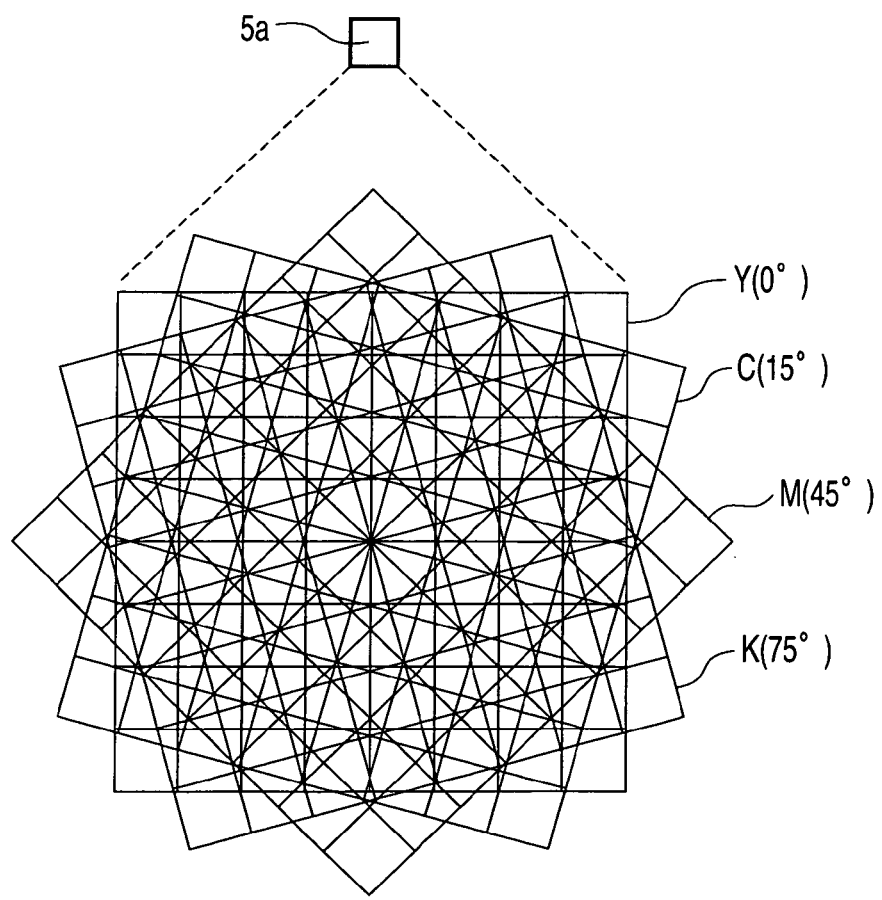
FIG. 30 is a view showing a part of the color image in FIG. 29 in an enlarged scale.
Figure 31:
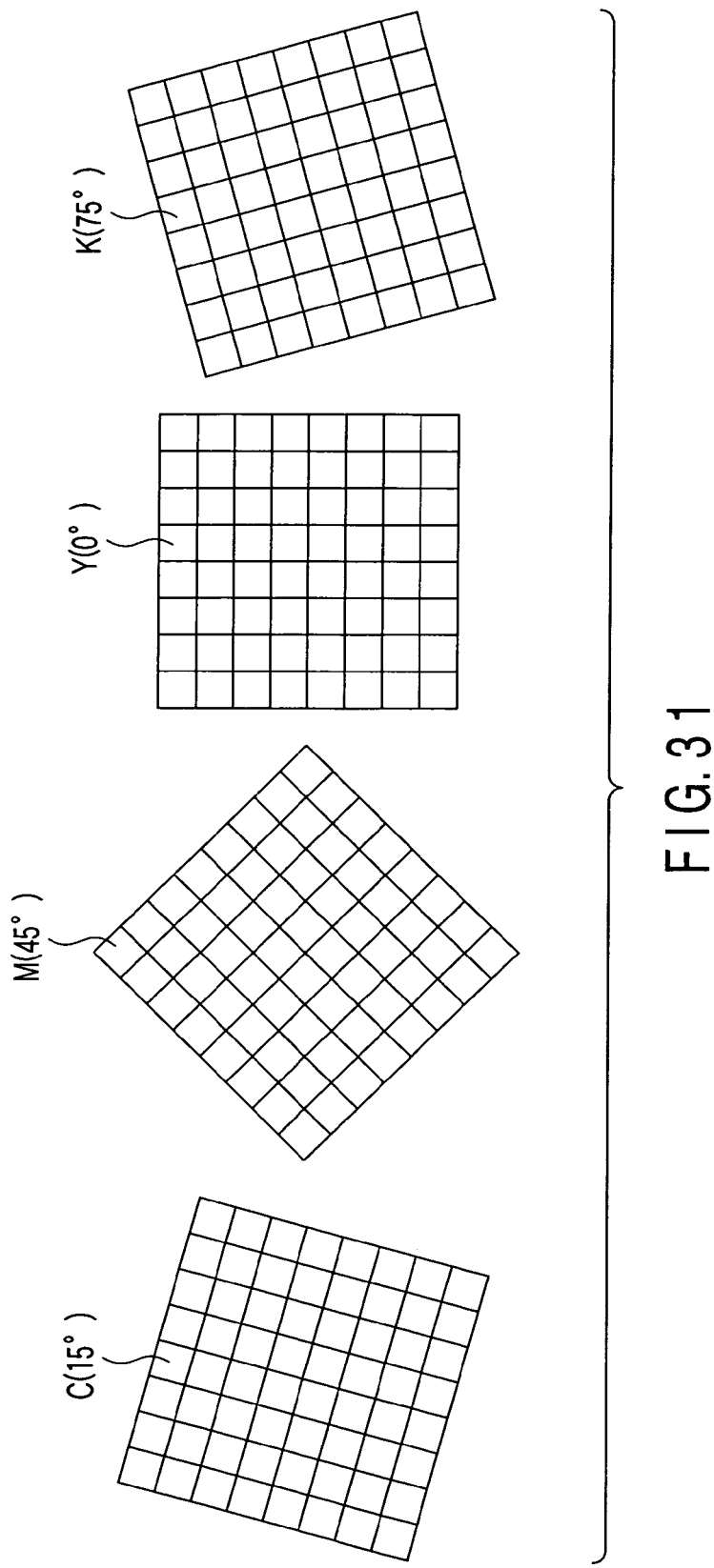
FIG. 31 is a view showing respective pieces of separated color component information in FIG. 30.

The first color image expression method will be described first. FIG. 29 shows an example of a color image 5 formed on a recorded material 4 by an electrophotography method. FIG. 30 is a partially enlarged view of a part 5a of the color image 5 shown in FIG. 29, and FIG. 31 shows respective pieces of separated color component information shown in FIG. 30. This is a method of forming a color image while giving halftones to respective colors by tilting the pixel forming directions of yellow (Y) color component information, magenta (M) color component information, cyan (C) color component information, and black (K) color component information through 0° (to be referred to as a screen angle hereinafter), 45°, 15°, and 75°, respectively (this method will be referred to as a screening method hereinafter), as shown in FIGS. 30 and 31.

Figure 32:
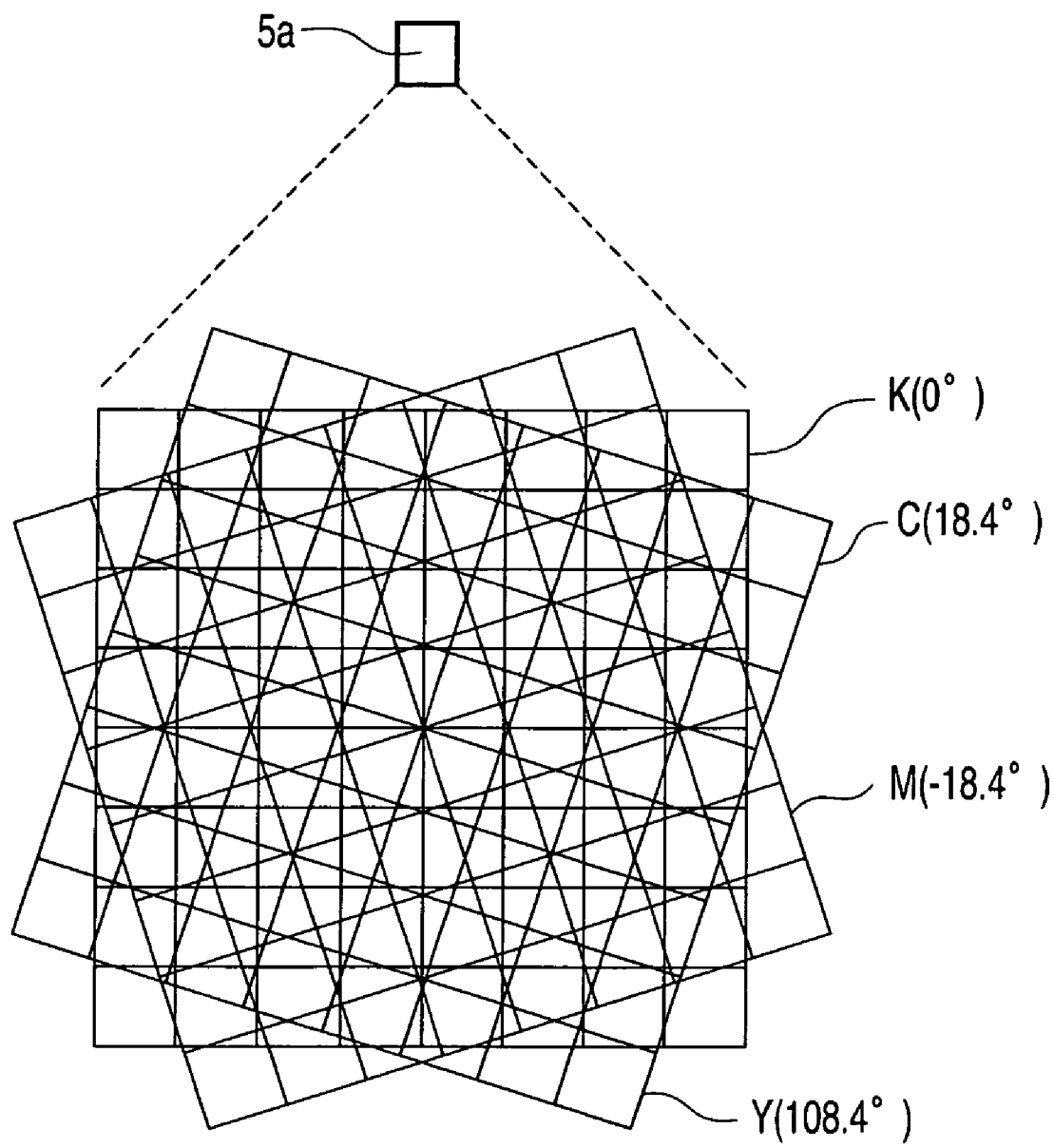
FIG. 32 is a view showing a part of the color image in FIG. 29 in an enlarged scale.
Figure 33:
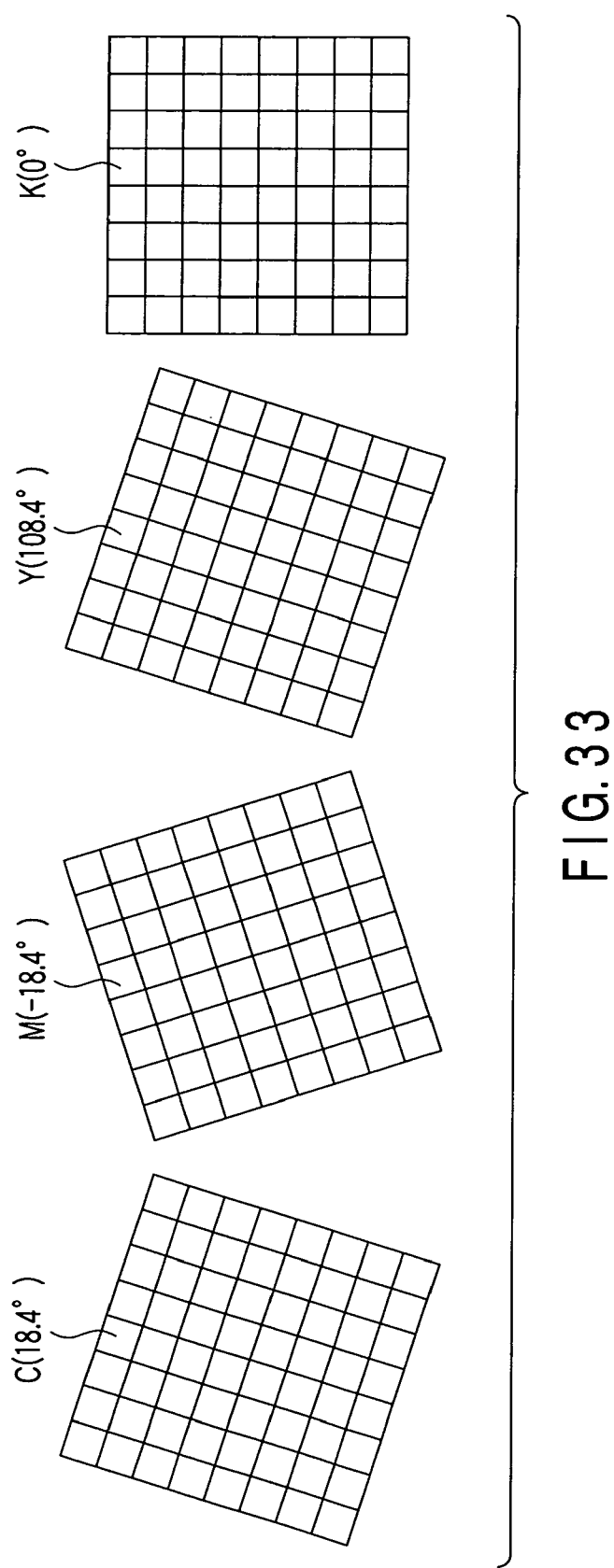
FIG. 33 is a view showing respective pieces of separated color component information in FIG. 32.

The second color image expression method will be described below. FIG. 32 is a partially enlarged view of the part 5a of the color image 5 shown in FIG. 29, and FIG. 33 shows respective pieces of separated color component information shown in FIG. 32. This is a method of forming a color image while giving halftones to respective colors by tilting the pixel forming directions of yellow (Y) color component information, magenta (M) color component information, cyan (C) color component information, and black (K) color component information through 108.4° (to be referred to as a screen angle hereinafter), −18.4°, 18.4°, and 0°, respectively (this method will be referred to as a screening method hereinafter), as shown in FIGS. 32 and 33.

Since a color image can be formed without accurately superposing inks by these first and second color image expression methods, occurrence of any color misregistration upon deviation of pixels can be prevented.

The first embodiment will be described below.

The first embodiment is applied to the case of the first color image expression method described above using FIGS. 30 and 31.

Figure 1:
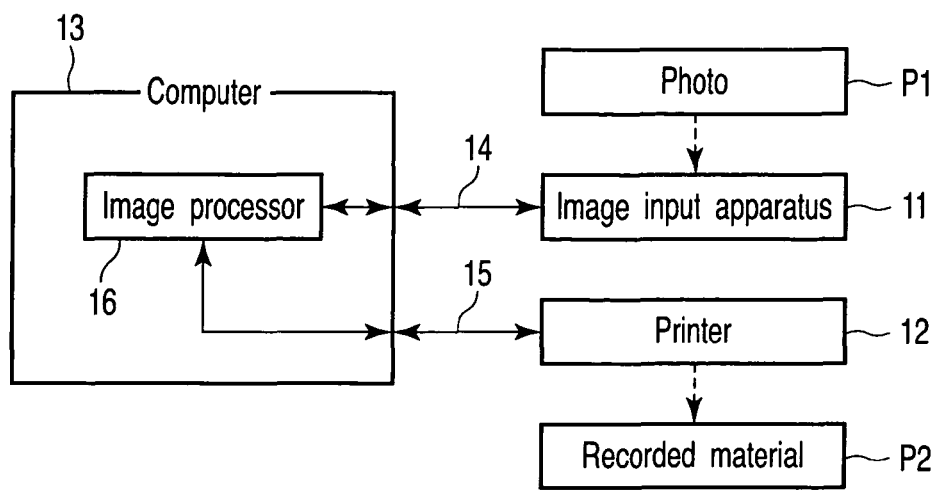
FIG. 1 is a schematic block diagram showing the arrangement of an image processing system to which an image processing apparatus and image processing method that embed sub information according to the first embodiment are applied.

FIG. 1 shows the schematic arrangement of an image processing system to which an image processing apparatus and image processing method that embed sub information according to the first embodiment are applied. This image processing system roughly comprises an image input apparatus 11 serving as an image input means, a printer 12 serving as a recording means, a computer 13 that executes various kinds of processing, and two-way communication means 14 and 15 for connecting the image input apparatus 11, printer 12, and computer 13 to be able to communicate with each other.

The image input apparatus 11 inputs color image information such as a face image or the like on a color photo (printed material) P1 as a digital image, and comprises, for example, a digital camera, video camera, flatbed scanner, or the like. In this embodiment, for example, a scanner is used.

The printer 12 outputs a recorded material P2 used as a personal authentication medium such as an ID card or the like by recording color image information such as a face image or the like, and a binary image such as characters or the like. In this embodiment, the printer 12 is used as a dedicated printer.

The computer 13 comprises an image processor 16 as an image processing means for executing sub information embedding processing for generating composite image information by embedding sub information in image information input by the image input apparatus 11 in an invisible state to the human eye, and the like.

Note that the computer 13 may be a personal computer or a dedicated board which comprises a CPU, semiconductor memory, hard disk device, image capture board, and the like. In this embodiment, a personal computer is used.

Note that the image processor 16 of this embodiment is implemented by a module of an application program which runs on the personal computer.

The two-way communication means 14 and 15 are not particularly limited as long as they can communicate signals in two ways, and may comprise USB, SCSI, or the like. In this embodiment, USB2.0 is used.

Figure 2:
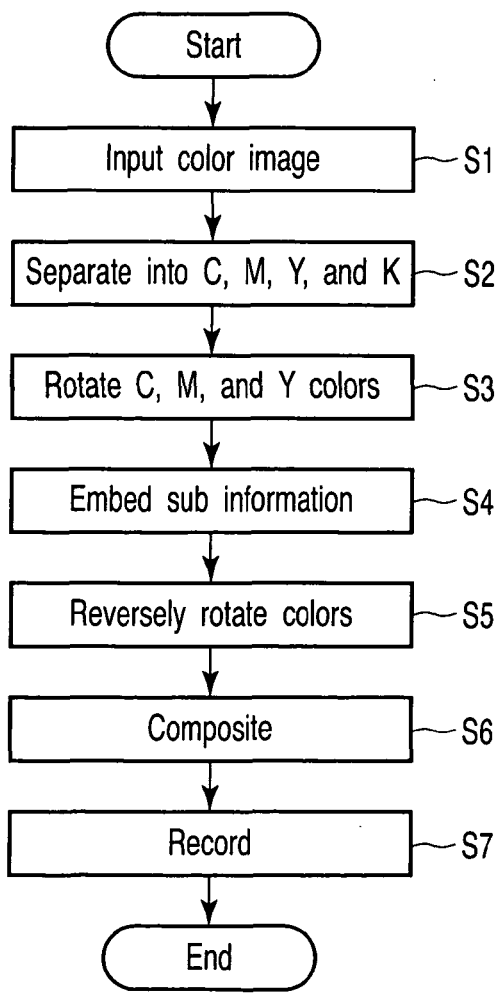
FIG. 2 is a flowchart for explaining the overall processing operation of the image processing system that embeds sub information according to the first embodiment.

The overall operation of the image processing system which comprises the aforementioned arrangement and embeds sub information according to the first embodiment will be described below with reference to the flowchart shown in FIG. 2.

The image input apparatus 11 inputs color image information such as a face image or the like as main information (step S1). Assume that the color image information is a color face image on the photo (printed material) P1. However, the present invention is not limited to such specific information. The input color image information is input to the image processor 16 of the computer 13.

The image processor 16 separates the input color image information into four pieces of color component information (at least three pieces of image information) of cyan (C), magenta (M), yellow (Y), and black (K) as ink colors used to record color image information (step S2). The image processor 16 rotates the three pieces of color component information of cyan (C), magenta (M), and yellow (Y) obtained by color separation through predetermined angles, respectively (step S3).

The image processor 16 embeds sub information in each rotated color component information (step S4). Next, the image processor 16 rotates the respective pieces of color component information embedded with the sub information through the same angles in a direction opposite to that in step S3 (step S5).

The image processor 16 generates composite image information (color image information) by compositing the pieces of reversely rotated color component information (step S6), and sends the generated composite image information to the printer 12. The printer 12 records the composite image information embedded with the sub information on a recording medium, thus obtaining the recorded material P2 (step S7).

The embedding processing (that in step S4) for embedding the sub information in each color component information by the image processor 16 will be described in detail below.

Figure 3:
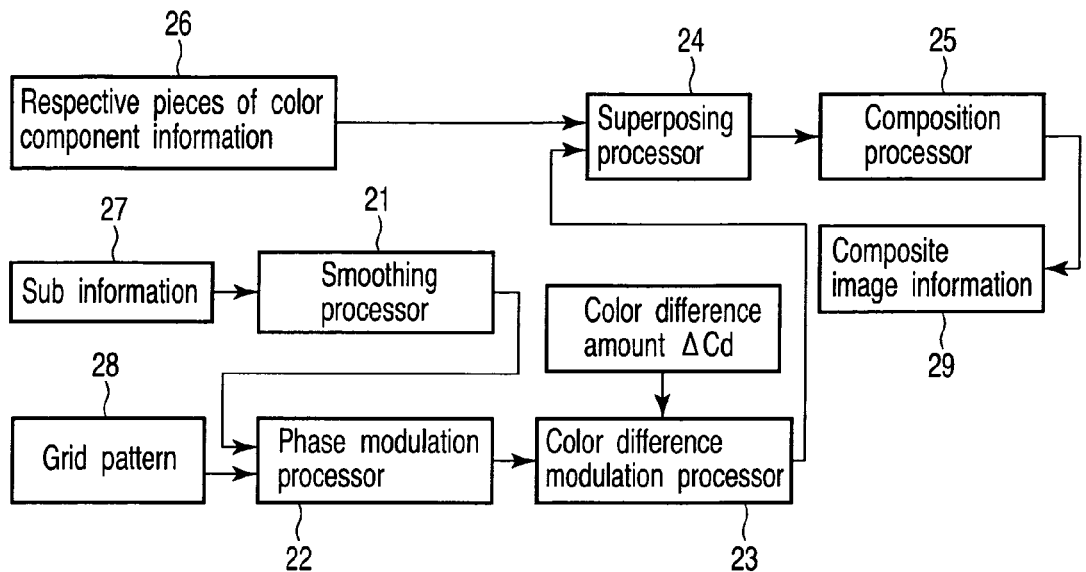
FIG. 3 is a schematic block diagram showing the arrangement of principal part in an image processor.

FIG. 3 shows the arrangement of principal part in the image processor 16. The image processor 16 comprises a smoothing processor 21, phase modulation processor 22, color difference modulation processor 23, superposing processor 24, and composition processor 25. These processors are modules of the application program which runs on the personal computer. As for the embedding processing, for example, a digital watermark processing method described in Jpn. Pat. Appln. KOKAI Publication Nos. 11-168616 and 2001-268346, and the like can be applied.

Each color component information 26 is that on which sub information 27 is to be superposed, and which has been rotated through a predetermined angle, and is one of color-separated components of image information associated with a color face image on a recorded material of this embodiment. The face image information is defined by forming pixels in line in the vertical and horizontal directions of an image. This information has information of 24 bits (8 bits per R, G, or B component) per pixel.

The sub information (embedded image information) 27 is obtained by, for example, converting information to be embedded into binary image information, and corresponds to an identification number (ID number) or the like on a personal authentication medium. This information has 1-bit information per pixel.

A color difference grid pattern 28 is a grid-like pattern, and is also used as key information upon reproducing the sub information 27. This pattern has 1-bit information per pixel.

Initially, the smoothing processor 21 executes smoothing processing to have a black pixel="1" and a white pixel="0" of the sub information 27. In this case, the processor 21 extracts a region of a plurality of pixels in the horizontal direction (x-direction) of the image, and calculates a weighted mean of these pixels.

The phase modulation processor 22 applies phase modulation to the color difference grid pattern 28 based on the result of the smoothing processing of the smoothing processor 21. In this embodiment, the processor 22 rotates a 2×2 pixel pattern (black and white pixels alternately appear) clockwise through 90°.

Figure 4:
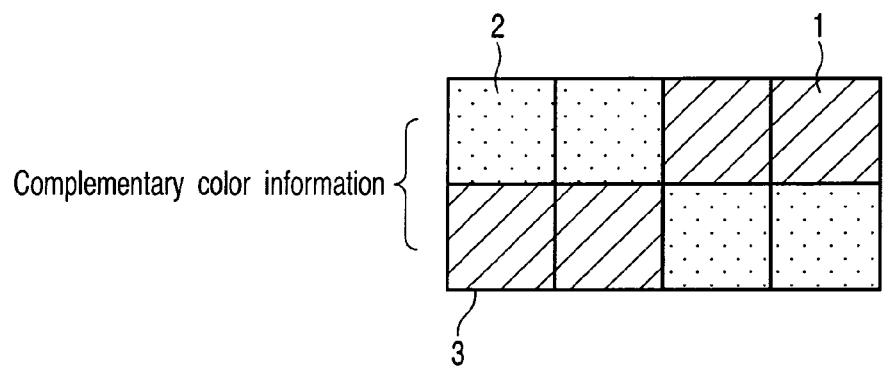
FIG. 4 is a view showing an example of a color difference grid pattern.

The color difference modulation processor 23 executes color difference modulation processing using a predetermined color difference amount $\Delta Cd$ based on the phase modulation result of the phase modulation processor 22. In this case, the processor 23 independently calculates three components, cyan (C), magenta (M), and yellow (Y). For example, when the color difference grid pattern 28 is a color difference grid pattern 1 in which red-rich pixels (dotted patterns) 2 and cyan-rich pixels (hatched patterns) 3 are repetitively allocated, as shown in FIG. 4, C data is modulated by $-\Delta Cd$ and M and Y data are modulated by $+\Delta Cd$ for an area corresponding to each red-rich pixel 2, and C data is modulated by $+\Delta Cd$ and M and Y data are modulated by $-\Delta Cd$ for an area corresponding to each cyan-rich pixel 3.

The superposing processor 24 executes superposing processing using the color difference modulation processing result of the color difference modulation processor 23 and the respective pieces of color component information 26, thereby superposing the modulated color difference grid pattern 28 on the respective pieces of color component information 26. More specifically, C, M, and Y values of the color difference modulation processing result are respectively added to C, M, and Y values of the respective pieces of color component information 26.

The composition processor 25 rotates the respective pieces of color component information 26 superposed with the color difference grid pattern 28 in a direction opposite to the rotation direction (that in step S3) through the same angles, and composites the respective pieces of reversely rotated color component information 26, thus generating composite image information 29.

Upon execution of the aforementioned embedding processing, the sub information 27 can be superposed on the respective pieces of color component information 26. The composite image information 29 superposed with the sub information 27 is sent to the printer 12, and is recorded on a recording medium, thus obtaining the recorded material P2.

Figure 5:
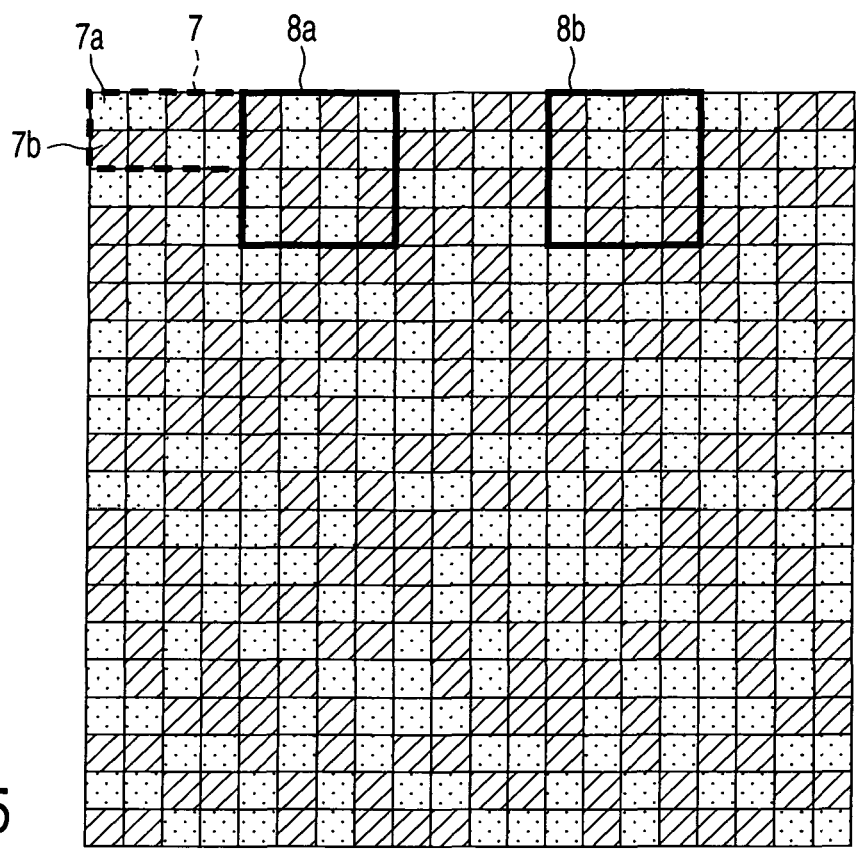
FIG. 5 is a view for explaining a pixel array of the color difference grid pattern.
Figure 6:
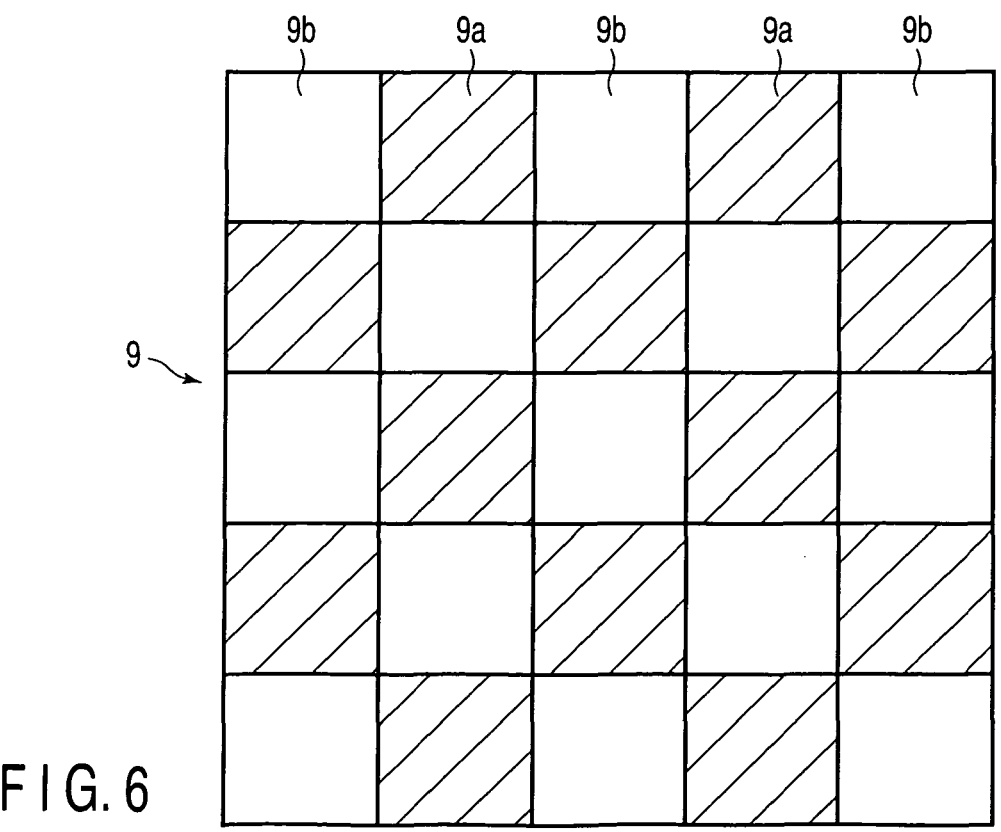
FIG. 6 is a view for explaining sub information.

FIGS. 5 and 6 illustrate a pixel array of the modulated color difference grid pattern and the sub information according to the first embodiment. An area bounded by the bold broken line in FIG. 5 indicates a color difference grid pattern 7, in which two pixels 7a indicated by halftone dots and two pixels 7b indicated by hatching are alternately arranged, and which has a configuration of 4 pixels×2 lines.

As is known, with the human visual characteristics, a discriminable tone difference between pixels becomes smaller with decreasing resolution, and the color difference value needs to assume a value according to the characteristics. In this embodiment, the color difference value ΔCd="16" so as to embed the sub information in an invisible state.

The pixel 7a indicated by halftone dots and the pixel 7b indicated by hatching have a complementary color relationship. In this embodiment, the pixel 7a indicated by halftone dots is red-rich, and the pixel 7b indicated by hatching is cyan-rich as a complementary color of red.

Color difference grid pattern groups 8a, 8b, and the like in FIG. 5 have a 90° phase difference from neighboring color difference grid pattern groups. FIG. 6 shows an example of sub information 9, which is a binary image defined by black cells (indicated by hatching) 9a and white cells 9b. The color difference grid pattern groups 8a and 8b in FIG. 5 are located at a position corresponding to the black cell 9a in FIG. 6. That is, in this embodiment, by modulating the phase of the color difference grid pattern, the sub information 9 is superposed on each color component information.

Figure 7A:
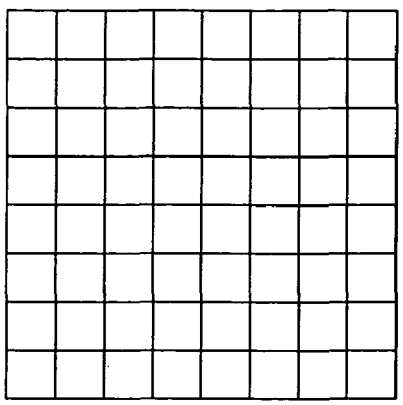
FIGS. 7A to 7D are views for explaining individual color rotation processing, superposing (embedding) processing, and individual color reverse rotation processing.

FIGS. 7A to 7D are explanatory views illustrating the individual color rotation processing (step S3), superposing (embedding) processing (step S4), and individual color reverse rotation processing (step S5). FIG. 7A shows a part of one color component information of color components separated by the color separation processing in step S2.

Figure 7B:
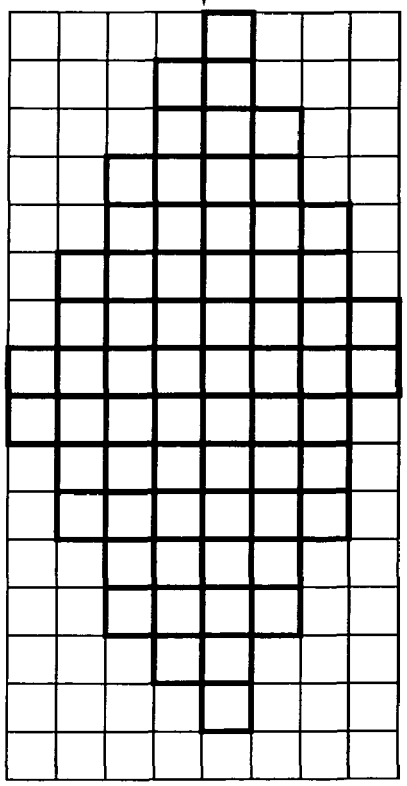

FIG. 7B shows one color component information which is obtained by rotating the color component information in FIG. 7A through 45° by the individual color rotation processing in step S3. The angle in FIG. 7B is 45°, and this embodiment represents magenta color component information. For example, the processing for cyan color component information can execute rotation processing through an angle of 15°.

Figure 7C:
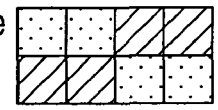
Figure 7D:
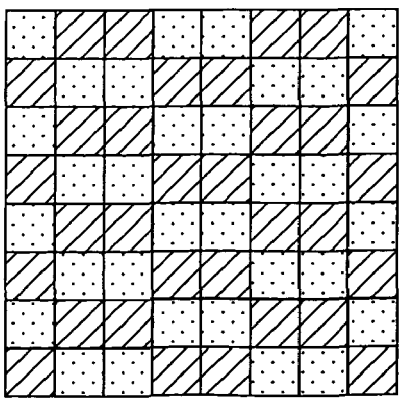

As shown in FIG. 7B, a color difference grid pattern which is shown in FIG. 7C and is modulated by sub information is superposed on the color component information rotated through the predetermined angle shown in FIG. 7B. FIG. 7D shows one color component information obtained such that the color component information in FIG. 7B superposed with the color difference grid pattern is rotated reversely through 45° in the individual color reverse rotation processing in step S5.

As described above, the color difference grid pattern can be superposed on the color component information titled through the predetermined angle.

In the above description, the respective pieces of color component information of cyan, magenta, and yellow obtained by color separation are respectively rotated through the predetermined angles, and the sub information is embedded in each rotated color component information. The respective pieces of color component information embedded with the sub information are respectively rotated through the same angles in a direction opposite to the above rotation, and the respective pieces of color component information reversely rotated through the predetermined angles are recorded on a recording medium. However, processing opposite to the above processing may be executed, and will be described below.

FIG. 8A shows a part of one color component information of color components separated by the color separation processing. FIG. 8B shows a color difference grid pattern modulated by sub information, and FIG. 8C shows a color difference grid pattern obtained by rotating that shown in FIG. 8B through 45°. The angle in FIG. 8C is 45°, and this embodiment represents magenta color component information. For example, the processing for cyan color component information can execute rotation processing through an angle of 15°.

The color difference grid pattern which is shown in FIG. 8C and is rotated through the predetermined angle is superposed on the color component information shown in FIG. 8A. FIG. 8D shows one color component information superposed with the color difference grid pattern by the superposing processing.

With this processing as well, the color difference grid pattern titled through the predetermined angle can be superposed on each color component information as in the case in which the color difference grid pattern is superposed on each color component information rotated through the predetermined angle.

Figure 9:
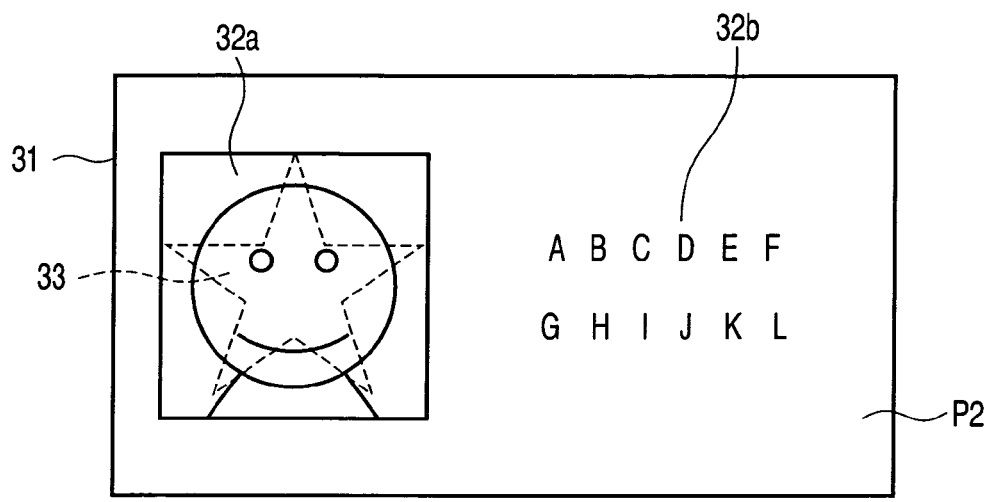
FIG. 9 is a view showing a practical example of a created recorded material.

FIG. 9 shows a practical example of the recorded material P2 created by the aforementioned image processing. The recorded material P2 is, for example, a personal authentication medium such as an ID card or the like, which is created by recording a face image 32a for personal authentication and a character image (personal management information and the like) 32b on one surface of a card-shaped recording medium 31. Since the personal authentication medium needs to undergo measures against falsification and forgery, sub information (a star mark indicated by the broken line) 33 obtained by modulating the color difference grid pattern 7 is superposed on the face image 32a in an invisible state.

Note that the face image 32a is color image information, and the star mark as the sub information 33 is binary image information. Respective color inks of yellow, magenta, cyan, and black that form the color image information (face image 32a) are configured to have tilts of different predetermined angles for respective colors, and the color difference grid pattern is formed to have tilts of different angles for respective colors.

An image processing apparatus and image processing method according to the first embodiment, which reproduce the sub information from the printed material P2 created as described above, will be described below.

Figure 10:
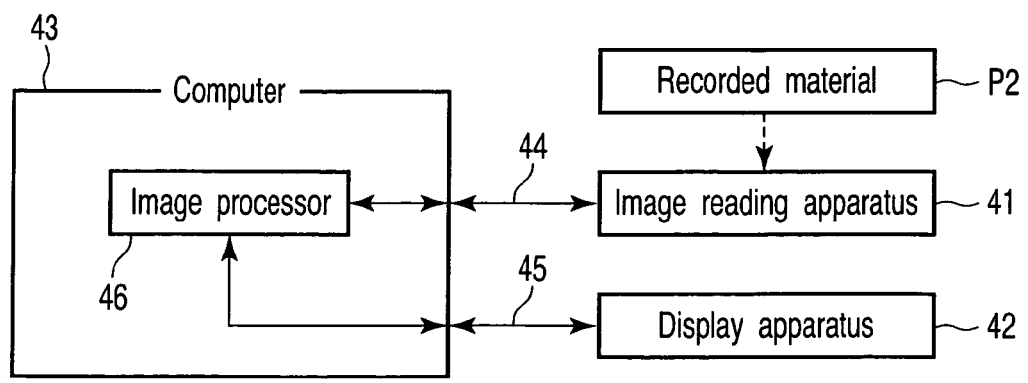
FIG. 10 is a schematic block diagram showing the arrangement of an image processing system to which an image processing apparatus and image processing method that reproduce sub information from a recorded material according to the first embodiment are applied.

FIG. 10 schematically shows the arrangement of an image processing system to which an image processing apparatus and image processing method for reproducing sub information from a printed material according to the first embodiment are applied. This image processing system roughly comprises an image reading apparatus 41 as a reading means, a display apparatus 42 as an output means, a computer 43 that executes various kinds of processing, and two-way communication means 44 and 45 for connecting the image reading apparatus 41, display apparatus 42, and computer 43 to be able to communicate with each other.

The image reading apparatus 41 reads color image information on the recorded material P2 as a digital image, and comprises a flatbed scanner, digital camera, or the like. In this embodiment, for example, a scanner is used. The display apparatus 42 displays and outputs various kinds of information such as reproduced sub information and the like.

The computer 43 comprises an image processor 46 serving as an image processing means for executing sub information reproduction processing for reproducing, from color image information read by the image reading apparatus 41, sub information embedded in that color image information.

Note that the computer 43 may be a personal computer or a dedicated board which comprises a CPU, semiconductor memory, hard disk device, image capture board, and the like. In this embodiment, a personal computer is used.

Note that the image processor 46 of this embodiment is implemented by a module of an application program which runs on the personal computer.

The two-way communication means 44 and 45 are not particularly limited as long as they can communicate signals in two ways, and may comprise USB, SCSI, or the like. In this embodiment, USB2.0 is used.

The overall processing operation of the image processing system which comprises the aforementioned arrangement and reproduces sub information from a recorded material according to the first embodiment will be described below with reference to the flowchart shown in FIG. 11.

The image reading apparatus 41 reads color image information on the recorded material P2 (step S11). The read color image information is input to the image processor 46 of the computer 43. The image processor 46 separates the input color image information into respective pieces of color component information of cyan (C), magenta (M), and yellow (Y) as color inks that form the color image information (step S12). Note that pieces of color component information to be color-separated may be red (R), green (G), and blue (B).

Next, the image processor 46 rotates the respective pieces of color-separated color component information of cyan (C), magenta (M), and yellow (Y) in directions opposite to pixel forming directions of yellow, cyan, and magenta which form the color image information through the same angles as the tilt angles of the respective colors (step S13). With this processing, the pixel forming directions of the respective colors can agree with the vertical and horizontal directions of an image, and those of the color difference grid pattern can agree with the vertical and horizontal directions of the image.

The image processor 46 then applies processing for extracting sub information to the respective pieces of color component information which are reversely rotated through the predetermined angles, and extracts (reproduces) the sub information (step S14). The image processor 46 displays the extracted sub information on the display apparatus 42 (step S15), and the operator checks the authenticity of the recorded material P2 based on that of the sub information (step S16).

In the above description, the extracted sub information is displayed on the display apparatus 42, and the operator checks the authenticity of the recorded material P2 based on the displayed contents, i.e., the authenticity of the sub information. However, the authenticity checking may be executed automatically, and it will be described below with reference to the flowchart shown in FIG. 12.

Since the processes in steps S11 to S14 are the same as those in FIG. 11, a repetitive description thereof will be avoided, and only steps S17 to S19 different from FIG. 11 will be explained.

After the sub information is extracted (reproduced) in step S14, the image processor 46 collates the extracted sub information with, e.g., reference sub information, which is registered in advance (step S17), and checks the authenticity of the recorded material P2 by seeing if the two pieces of sub information have a predetermined relationship, i.e., if the two pieces of sub information match in this example (step S18). Then, the image processor 46 displays the checking result on the display apparatus 42 (step S19).

Note that the authenticity checking method of the recorded material P2 is not limited to the aforementioned method, but other methods may be used. For example, the authenticity may be checked by analyzing the extracted sub information. Alternatively, the authenticity of the recorded material P2 may be checked based on the presence/absence of the sub information in place of the authenticity checking of the recorded material P2 based on the authenticity of the sub information.

Figure 11:
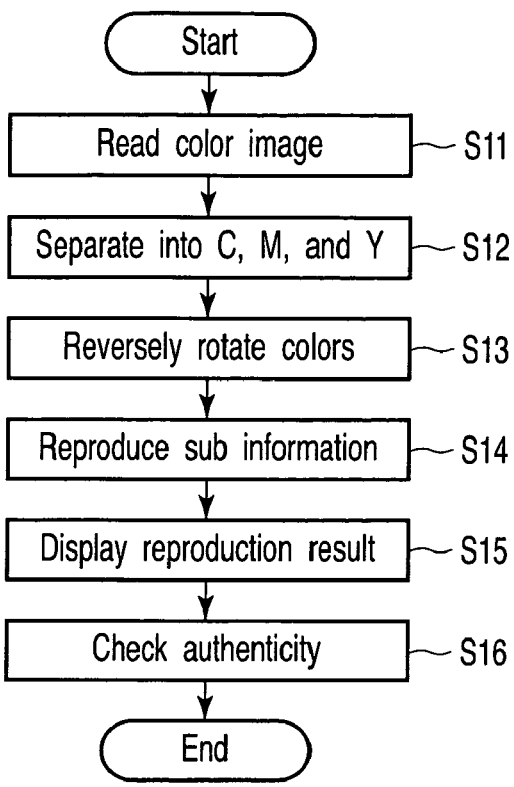
FIG. 11 is a flowchart for explaining the overall processing operation of the image processing system which reproduces sub information from a recorded material according to the first embodiment.
Figure 12:
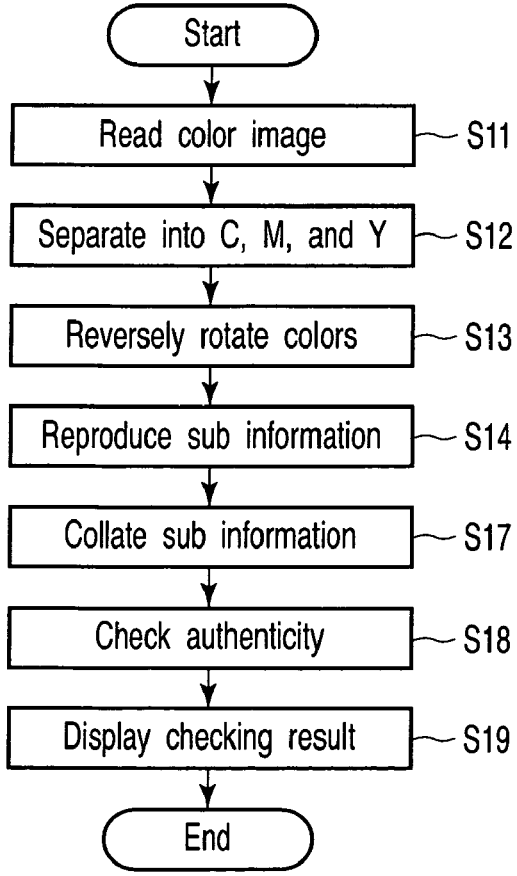
FIG. 12 is a flowchart for explaining another example of the overall processing operation of the image processing system which reproduces sub information from a recorded material according to the first embodiment.
Figure 13:
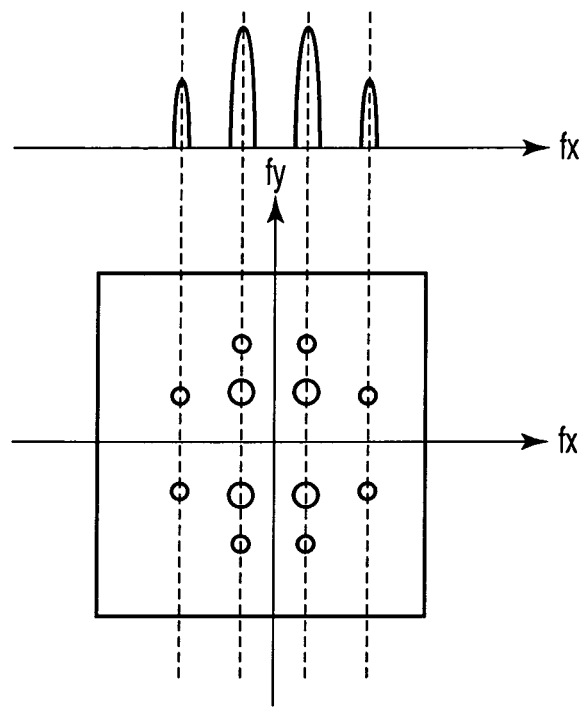
FIG. 13 is a view showing frequency signals of image information obtained by scanning a face image of a created printing material.

FIG. 13 illustrates signals upon converting the color component information obtained by the processing in step S13 in FIG. 11 into a spatial frequency domain. The horizontal axis plots the spatial frequency (fx) of the color component information in the horizontal direction, and the vertical axis plots that (fy) of the color component information in the vertical direction. Dotted circular signals are those of the color difference grid pattern 7.

The reproduction processing of the sub information according to the first embodiment can reproduce (extract) the sub information 9 by applying a band-pass filter of the frequencies corresponding to the signals of the color difference grid pattern 7.

As described above, according to the first embodiment, sub information can be superposed on color image information formed by tilting the pixel forming directions of respective color components to have predetermined angles, thus improving the resistance to falsification and forgery of the obtained recorded material.

The second embodiment will be described hereinafter.

The second embodiment is applied to the case of the second color image expression method described previously using FIGS. 32 and 33.

Since the arrangement of an image processing system according to the second embodiment is the same as that (FIG. 1) according to the first embodiment, a repetitive description thereof will be avoided.

Figure 14:
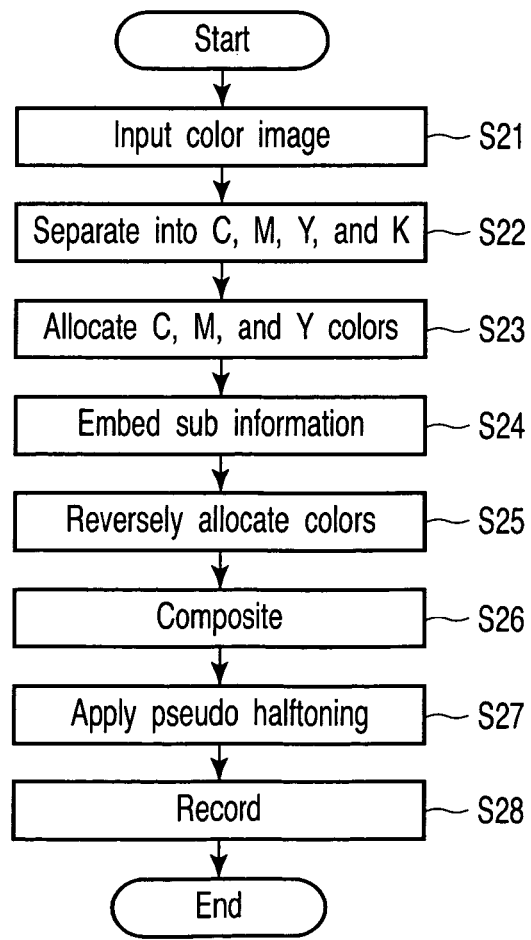
FIG. 14 is a flowchart for explaining the overall processing operation of an image processing system which embeds sub information according to the second embodiment.

The overall operation of the image processing system according to the second embodiment will be described below with reference to the flowchart shown in FIG. 14.

An image input apparatus 11 inputs color image information such as a face image or the like as main information (step S21). Assume that the color image information is a color face image on a photo (printed material) P1. However, the present invention is not limited to such specific information. The input color image information is input to an image processor 16 of a computer 13.

The image processor 16 separates the input color image information into four pieces of color component information (at least three pieces of image information) of cyan (C), magenta (M), yellow (Y), and black (K) as ink colors used to record color image information (step S22). The image processor 16 allocates pixels of the three pieces of color component information of cyan (C), magenta (M), and yellow (Y) to have predetermined angles (step S23).

The image processor 16 embeds sub information in each rotated color component information (step S24). Next, the image processor 16 allocates the pixels to restore them by applying the processing opposite to that in step S23 to the respective pieces of color component information embedded with the sub information (step S25).

The image processor 16 generates composite image information (color image information) by compositing the pieces of color component information whose pixel allocations are restored (step S26), and sends the generated composite image information to a printer 12.

The printer 12 applies pseudo halftoning processing using dither matrices for respective pieces of color component information to the composite image information embedded with the sub information (step S27), and obtains a recorded material P2 by recording the composite image information that has undergone the pseudo halftoning processing on a recording medium (step S28).

The embedding processing (that in step S24) for embedding the sub information in each color component information by the image processor 16 will be described in detail below with reference to FIG. 3 used in the first embodiment.

Each color component information 26 in case of the second embodiment is that which is allocated by the individual color allocation processing in step S23, on which sub information 27 is to be superposed, and which is one of color-separated components of image information associated with a color face image on a recorded material of this embodiment. Note that the face image information is defined by forming pixels in line in the vertical and horizontal directions of an image. This information has information of 24 bits (8 bits per R, G, or B component) per pixel.

Sub information (embedded image information) 27 is obtained by, for example, converting information to be embedded into binary image information, and corresponds to an identification number (ID number) or the like on a personal authentication medium. This information has 1-bit information per pixel.

A color difference grid pattern 28 is a grid-like pattern, and is also used as key information upon reproducing the sub information 27. This pattern has 1-bit information per pixel.

Initially, a smoothing processor 21 executes smoothing processing to have a black pixel="1" and a white pixel="0" of the sub information 27. In this case, the processor 21 extracts a region of a plurality of pixels in the horizontal direction (x-direction) of the image, and calculates a weighted mean of these pixels.

A phase modulation processor 22 applies phase modulation to the color difference grid pattern 28 based on the result of the smoothing processing of the smoothing processor 21. In this embodiment, the processor 22 rotates a 2×2 pixel pattern (black and white pixels alternately appear) clockwise through 90°.

A color difference modulation processor 23 executes color difference modulation processing using a predetermined color difference amount ΔCd based on the phase modulation result of the phase modulation processor 22. In this case, the processor 23 independently calculates three components cyan (C), magenta (M), and yellow (Y). For example, when the color difference grid pattern 28 is a color difference grid pattern 1 in which red-rich pixels (dotted patterns) 2 and cyan-rich pixels (hatched patterns) 3 are repetitively allocated, as shown in FIG. 4, C data is modulated by −ΔCd and M and Y data are modulated +ΔCd for an area corresponding to each red-rich pixel 2, and C data is modulated by +ΔCd and M and Y data are modulated by −ΔCd for an area corresponding to each cyan-rich pixel 3.

A superposing processor 24 executes superposing processing using the color difference modulation processing result of the color difference modulation processor 23 and the respective pieces of color component information 26, thereby superposing the modulated color difference grid pattern 28 on the respective pieces of color component information 26. More specifically, C, M, and Y values of the color difference modulation processing result are respectively added to C, M, and Y values of the respective pieces of color component information 26.

A composition processor 25 allocates the pixels to restore them by applying the processing opposite to that in step S23 to the respective pieces of color component information 26 superposed with the color difference grid pattern 28, and composites the respective pieces of color component information 26 in which the pixel allocations are restored, thus generating composite image information 29.

Upon execution of the aforementioned embedding processing, the sub information 27 can be superposed on the respective pieces of color component information 26. The composite image information 29 superposed with the sub information 27 is sent to the printer 12, and is recorded on a recording medium, thus obtaining a recorded material P2.

Since the pixel array of the modulated color difference grid pattern and sub information according to the second embodiment are the same as those of the first embodiment described above using FIGS. 5 and 6, a description thereof will not be given.

Figure 15A:
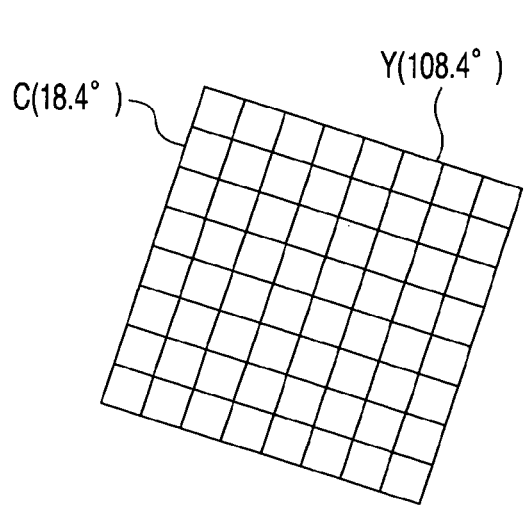
FIGS. 15A and 15B are views for explaining screen angles according to the second embodiment.
Figure 15B:
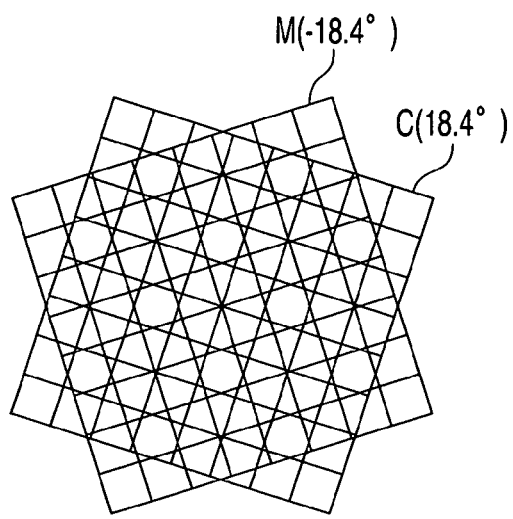

FIGS. 15A and 15B are views for explaining screen angles according to the second embodiment, and are enlarged views of a part 5a of a color image 5 shown in FIG. 29. In the second embodiment, the screen angles of cyan (C) and yellow (Y) are respectively 18.4° and 108.4°, and they have a 90° difference. Hence, as shown in FIG. 15A, cyan and yellow pixels are allocated to overlap each other. However, since the screen angles have a 90° difference, cyan information needs to be superposed to have a tilt through the screen angle corresponding to cyan upon superposing it on yellow information, so as to superpose them without disturbing the color difference grid pattern.

On the other hand, the screen angle of magenta (M) is −18.4°, and cyan and magenta pixels less overlap each other. For the color difference grid pattern shown in FIG. 4, red- and cyan-rich pixels need to be formed by superposing pixels of three or more colors. With a recording method using the screening method, pixels of three colors less overlap each other to disturb the color difference grid pattern, and the sub information cannot be superposed on the color image information.

Figure 16:
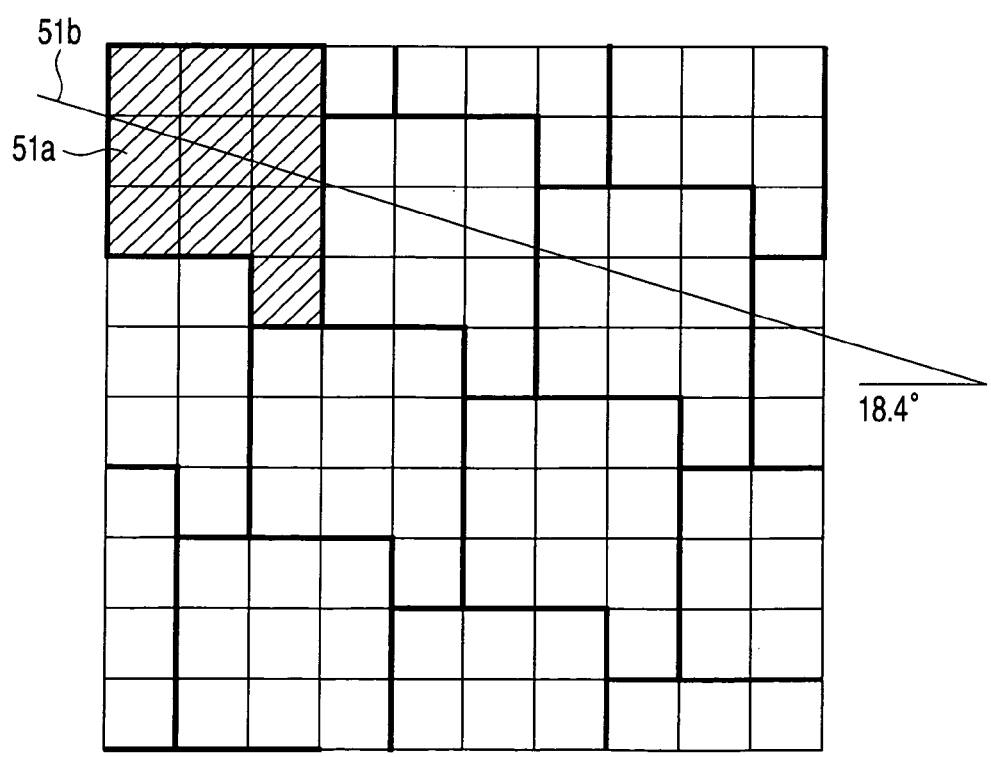
FIG. 16 is an explanatory view of a threshold matrix used to form a screen according to the second embodiment.
Figure 17:
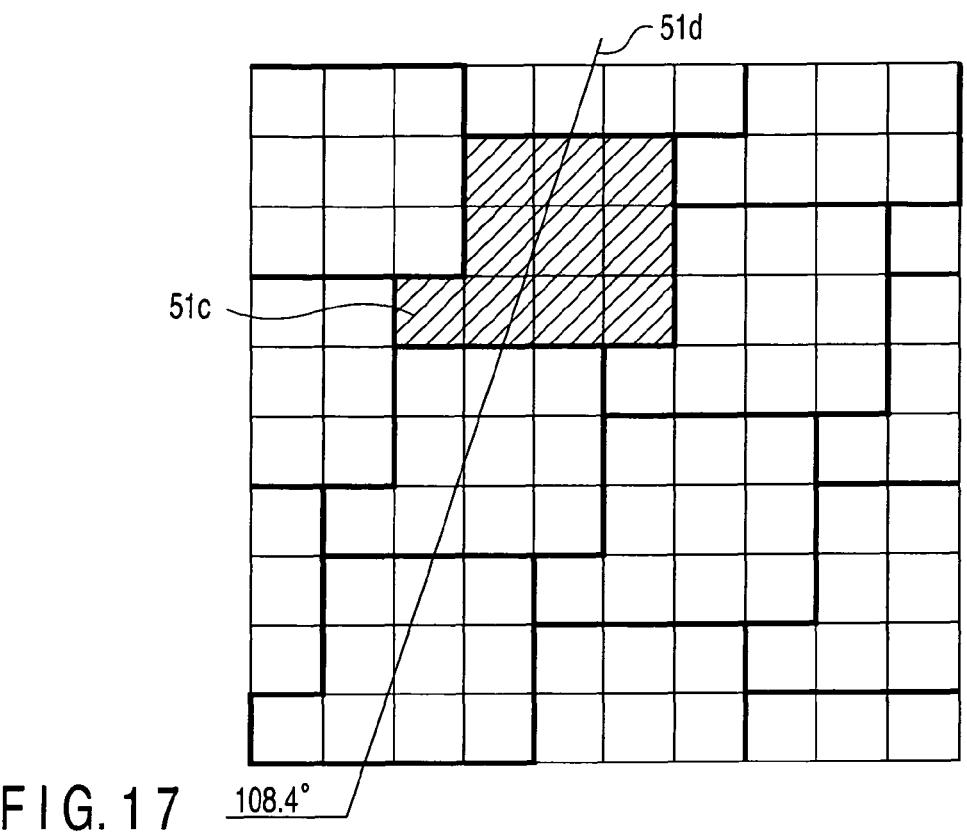
FIG. 17 is an explanatory view of a threshold matrix used to form a screen according to the second embodiment.
Figure 18:
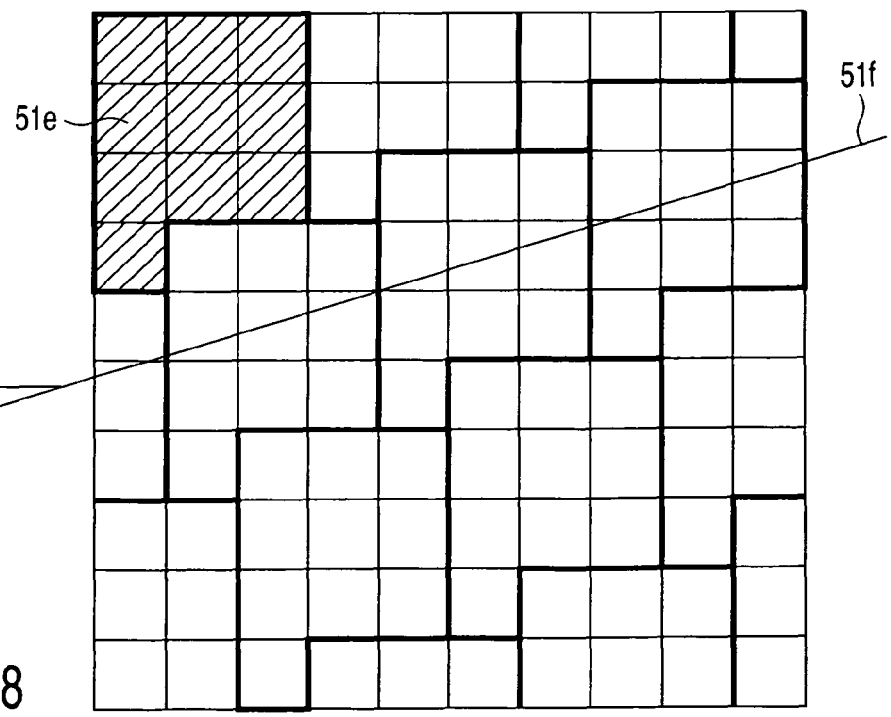
FIG. 18 is an explanatory view of a threshold matrix used to form a screen according to the second embodiment.

FIGS. 16, 17, and 18 show examples of threshold matrices used to form screens (pixel arrays) corresponding to cyan, magenta, and yellow.

FIG. 16 shows a threshold matrix used to form a screen corresponding to cyan. A matrix 51a including 10 pixels indicated by hatching in FIG. 16 is a unit matrix, and is a dither matrix used to express pseudo tones. By allocating the unit matrices 51a, as shown in FIG. 16, a screen angle=18.40 (an angle clockwise from the horizontal direction of FIG. 16) can be realized, as indicated by a straight line 51b in FIG. 16.

FIG. 17 shows a threshold matrix used to form a screen corresponding to yellow. A matrix 51c including 10 pixels indicated by hatching in FIG. 17 is a unit matrix, and is obtained by rotating the unit matrix 51a in FIG. 16 clockwise through 900. By allocating the unit matrices 51c, as shown in FIG. 17, a screen angle=108.4° can be realized, as indicated by a straight line 51d in FIG. 17.

FIG. 18 shows a threshold matrix used to form a screen corresponding to magenta. A matrix 51e including 10 pixels indicated by hatching in FIG. 18 is a unit matrix, and is obtained by inverting the unit matrix 51a in FIG. 16 axisymmetrically (flipping it horizontally) about the vertical direction in FIG. 18. By allocating the unit matrices 51e, as shown in FIG. 18, a screen angle=−18.4 can be realized, as indicated by a straight line 51f in FIG. 18.

Note that the screen angles are merely examples, and are not limited to the aforementioned combination.

FIGS. 19, 20, 21, and 22 are explanatory views illustrating the allocation processing, superposing processing, color difference grid pattern, and individual color reverse allocation processing of pieces of color component information of cyan and yellow.

Figure 19:
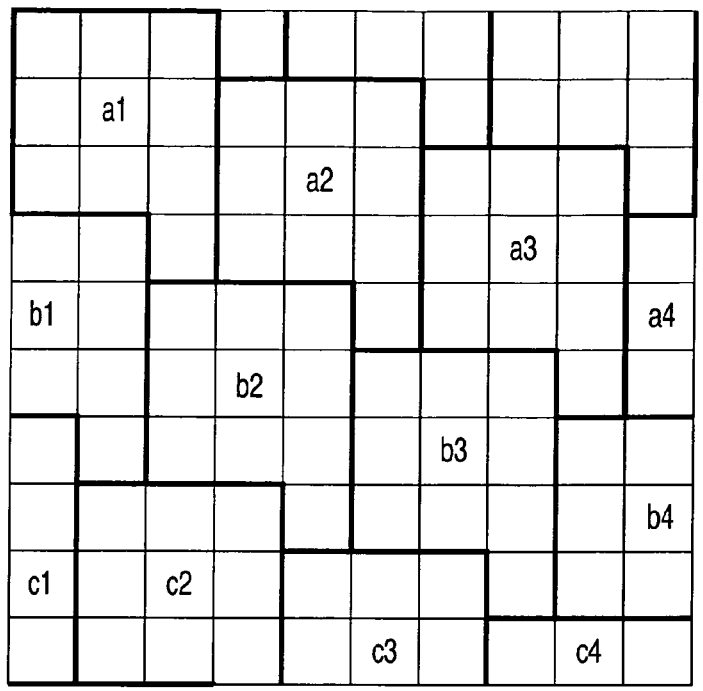
FIG. 19 is a view showing an example of a pixel array of an image according to the second embodiment.

FIG. 19 shows the pixel array of the color component information of each of cyan and yellow. Each bold frame including 10 pixels in FIG. 19 indicates the unit matrix of cyan. Reference numerals a1 to a4, b1 to b4, and c1 to c4 in FIG. 19 respectively denote pixel blocks each including nine pixels (3×3 pixels in the vertical and horizontal, directions), and all of a, b, and c groups have tilts through the screen angle corresponding to cyan. Yellow pixel blocks each including nine pixels match those of cyan, and have a screen angle 90° different from cyan, but these pixel blocks can be commonly used.

Figure 20:
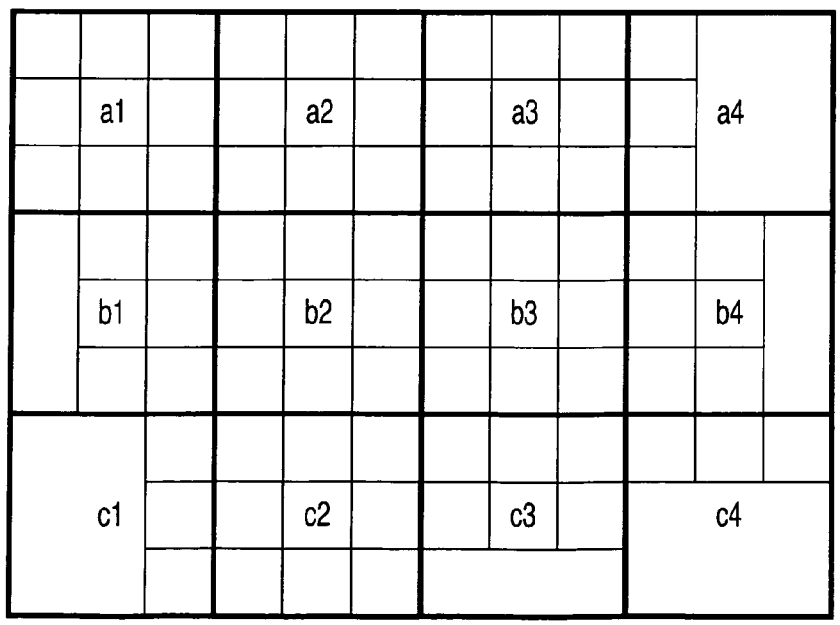
FIG. 20 is a view showing an example of a pixel array allocated by individual color allocation processing according to the second embodiment.

FIG. 20 shows a pixel array obtained by allocating pixels in FIG. 19 so that the pixel blocks each including nine pixels in FIG. 19 are arranged linearly to have each pixel block as a unit. The allocation processing corresponding to cyan and yellow according to this embodiment is processing for allocating pixel blocks to be rotated counterclockwise through the screen angle corresponding to cyan.

Figure 21:
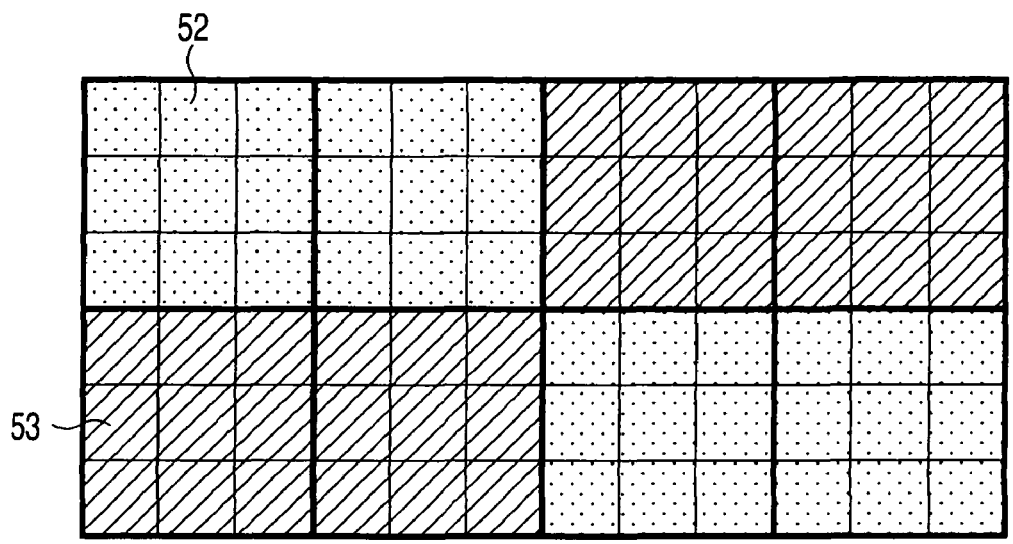
FIG. 21 is a view showing an example of a color difference grid pattern according to the second embodiment.

FIG. 21 shows a color difference grid pattern. One pixel of the color difference grid pattern shown in FIG. 4 corresponds to the pixel block including nine pixels. That is, each pixel block (a dot pattern in FIG. 21) 52 including nine pixels includes red-rich components, and each pixel block (a hatched pattern in FIG. 21) 53 including nine pixels includes cyan-rich components. The color difference grid pattern shown in FIG. 21 is superposed on the pixel array after allocation in FIG. 20.

Figure 22:
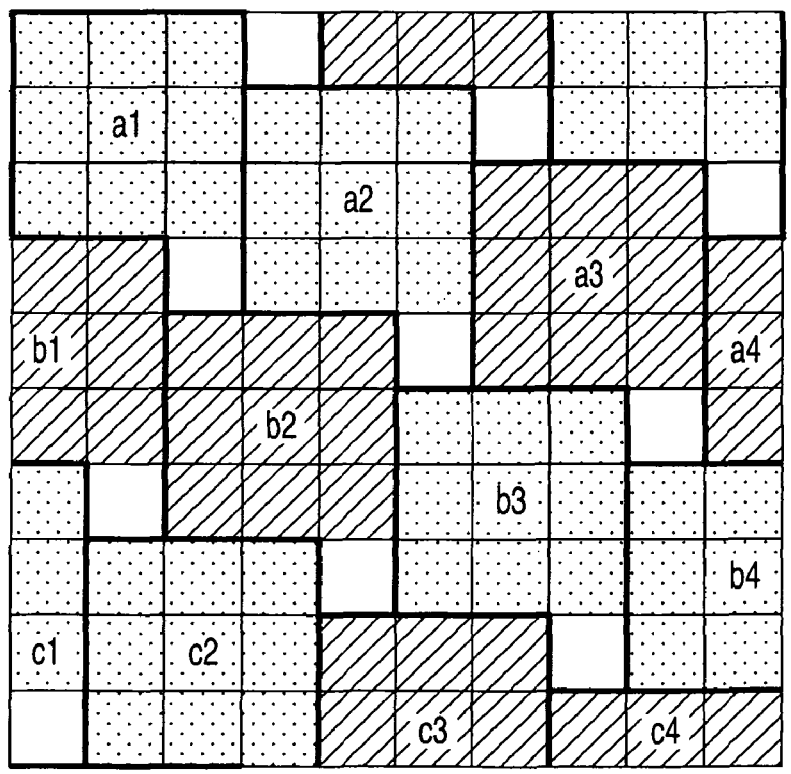
FIG. 22 is a view showing an example of a pixel array of an image after embedding of sub information according to the second embodiment.

FIG. 22 shows a pixel array allocated to restore the original pixel array shown in FIG. 19 after the color difference grid pattern in FIG. 21 is superposed on the pixel array in FIG. 20. A recording unit according to this embodiment forms a screen corresponding to a color of color component information. The screen is defined by threshold matrices, and is processed for each pixel block of the unit matrix. As shown in FIG. 21, since the color difference grid pattern can be superposed on nine-pixel blocks in the unit matrices, the color difference grid pattern is not disturbed even after the screen is formed.

As described above, the color difference grid pattern can be superposed on the pixel blocks having a tilt through the screen angle corresponding to cyan of the color component information of cyan. Also, the color difference grid pattern can be superposed on the pixel blocks having a tilt through the screen angle corresponding to cyan which is different from that corresponding to yellow of the color component information of yellow.

FIGS. 23, 24, 25, and 26 are explanatory views illustrating the allocation processing, superposing processing, color difference grid pattern, and individual color reverse allocation processing of color component information of magenta.

FIG. 23 shows the pixel array of the color component information of magenta. Each bold frame including 10 pixels in FIG. 23 indicates the unit matrix of magenta. Reference numerals d1 to d4, e1 to e4, and f1 to f4 in FIG. 23 respectively denote pixel blocks each including nine pixels (3×3 pixels in the vertical and horizontal directions) that form the unit matrix, and d, e, and f groups are pixel block groups selected so that an angle θ a straight line (that in FIG. 23) 54 that connects these groups and the horizontal direction in FIG. 23 make is close to the screen angle corresponding to cyan.

FIG. 24 shows a pixel array obtained by allocating pixels in FIG. 23 so that the pixel blocks each including nine pixels in FIG. 23 are arranged linearly to have each pixel block as a unit. The allocation processing corresponding to magenta according to this embodiment is processing for allocating pixel blocks by rearranging them to be rotated counterclockwise through the angle close to the screen angle corresponding to cyan.

Figure 25:
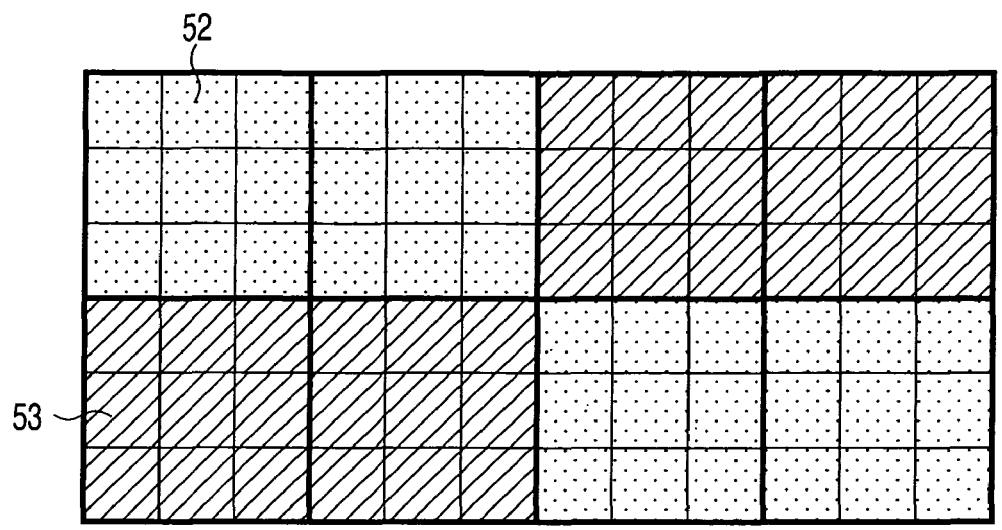
FIG. 25 is a view showing an example of a color difference grid pattern according to the second embodiment.
Figure 26:
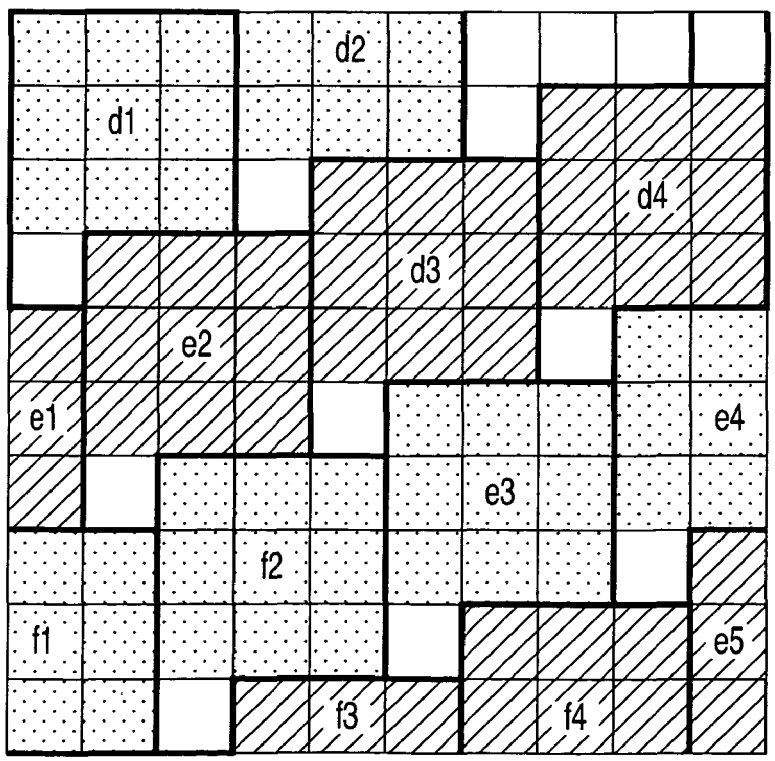
FIG. 26 is a view showing an example of a pixel array of an image after embedding of sub information according to the second embodiment.

FIG. 25 shows the same color difference grid pattern as in FIG. 21, and a repetitive description thereof will be avoided. The color difference grid pattern in FIG. 25 is superposed on the arranged pixel array. FIG. 26 shows a pixel array allocated to restore the original pixel array shown in FIG. 23 after the color difference grid pattern in FIG. 25 is superposed on the pixel array in FIG. 24. As shown in FIG. 26, since the color difference grid pattern can be superposed on nine-pixel blocks in the unit matrices, the color difference grid pattern is not disturbed even after the screen is formed. Furthermore, since the color difference grid pattern can be superposed to have the tilt angle close to the screen angle corresponding to cyan, the probability of overlapping pixels of three colors recorded by the recording unit can increase, and the sub information can be reliably superposed on the color image information.

As described above, the color difference grid pattern can be superposed on the pixel blocks of the color component information of magenta, which has a tilt through an angle that is different from the screen angle corresponding to magenta and is close to the screen angle corresponding to cyan.

Note that the recorded material P2 obtained by the second embodiment is the same as that of the first embodiment described previously using FIG. 9, and a repetitive description thereof will be avoided.

An image processing apparatus and image processing method according to the second embodiment, which reproduce the sub information from the printed material P2 created as described above, will be described below.

Note that the arrangement of an image processing system which reproduces sub information from a recorded material according to the second embodiment is the same as that of the aforementioned image processing system (FIG. 10) according to the first embodiment, and a repetitive description thereof will be avoided.

The overall processing operation of the image processing system which reproduces sub information from a recorded material according to the second embodiment will be described below with reference to the flowchart shown in FIG. 27.

An image reading apparatus 41 reads color image information on the recorded material P2 (step S31). The read color image information is input to an image processor 46 of a computer 43. The image processor 46 separates the input color image information into respective pieces of color component information of cyan (C), magenta (M), and yellow (Y) as color inks that form the color image information (step S32). Note that pieces of color component information to be color-separated may be red (R), green (G), and blue (B).

Next, the image processor 46 allocates pixels of the respective pieces of color-separated color component information of cyan (C), magenta (M), and yellow (Y) to have predetermined angles in the same manner as upon embedding sub information (step S25 in FIG. 14) (step S33).

The image processor 46 applies processing for extracting sub information to each allocated color component information, and extracts (reproduces) the sub information (step S34). The image processor 46 then displays the extracted sub information on a display apparatus 42 (step S35), and the operator checks the authenticity of the recorded material P2 based on that of the sub information (step S36).

In the above description, the extracted sub information is displayed on the display apparatus 42, and the operator checks the authenticity of the recorded material P2 based on the displayed contents, i.e., the authenticity of the sub information. However, the authenticity checking may be executed automatically, and it will be described below with reference to the flowchart shown in FIG. 28.

Since the processes in steps S31 to S34 are the same as those in FIG. 27, a repetitive description thereof will be avoided, and only steps S37 to S39 different from FIG. 27 will be explained.

After the sub information is extracted (reproduced) in step S34, the image processor 46 collates the extracted sub information with, e.g., reference sub information, which is registered in advance (step S37), and checks the authenticity of the recorded material P2 by seeing if the two pieces of sub information have a predetermined relationship, i.e., if the two pieces of sub information match in this example (step S38). Then, the image processor 46 displays the checking result on the display apparatus 42 (step S39).

Note that the authenticity checking method of the recorded material P2 is not limited to the aforementioned method, but other methods may be used. For example, the authenticity may be checked by analyzing the extracted sub information. Alternatively, the authenticity of the recorded material P2 may be checked based on the presence/absence of the sub information in place of the authenticity checking of the recorded material P2 based on the authenticity of the sub information.

As described above, according to the second embodiment, sub information can be superposed on color image information formed by tilting the pixel forming directions of respective color components to have predetermined angles, thus improving the resistance to falsification and forgery of the obtained recorded material.

In the description of the above embodiments, color image information such as a face image or the like is input, the input color image information is separated into pieces of color component information of C, M, and Y, and the subsequent processes are applied to each of the pieces of color-separated color component information of colors. However, the present invention is not limited to such specific embodiments. The present invention can obtain the same operations and effects when image information of three or more colors as main information, e.g., pieces of externally color-separated color component information of C, M, and Y, and the subsequent processes are applied to each of the pieces of input color component information of colors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   image input means for inputting main image information defined by first, second, and third color component information corresponding to at least three colors;
   modulation means for modulating a color difference grid pattern by sub information;
   superposing means for superposing the modulated color difference grid pattern on each of the first, second, and third color component information after the modulated color difference grid pattern and for rotating each of the first, second, and third color component information by a respective predetermined rotation angle; and
   composition means for compositing the first, second, and third color component information superposed with the modulated color difference grid pattern to generate color image information.

2. The apparatus according to claim 1, wherein the superposing means relatively rotates the first color component information and the modulated color difference grid pattern in a predetermined rotation direction through a first rotation angle, rotates the second color component information and the modulated color difference grid pattern in the predetermined rotation direction through a second rotation angle, rotates the third color component information and the modulated color difference grid pattern in the predetermined rotation direction through a third rotation angle, and then superposes the modulated color difference grid pattern on each of the first color component information, the second color component information, and the third color component information, and
   the composition means comprises first processing means for rotating the first color component information superposed with the color difference grid pattern in a direction opposite to the predetermined rotation direction through the first rotation angle, rotating the second color component information superposed with the color difference grid pattern in the direction opposite to the predetermined rotation direction through the second rotation angle, and rotating the third color component information superposed with the color difference grid pattern in the direction opposite to the predetermined rotation direction through the third rotation angle, and second processing means for compositing the first, second and third color component information which are rotated in the opposite direction.

3. The apparatus according to claim 1, wherein the superposing means rotates the modulated color difference grid pattern of the first, second and third color component information, and the modulated color difference grid pattern, and then superposes the modulated and rotated color difference grid pattern on each of the first, second and third color component information.

4. The apparatus according to claim 1, further comprising recording means for recording the color image information on a recording medium.

5. An image processing method comprising:
   inputting main image information defined by first, second and third color component information corresponding to at least three colors;
   rotating a color difference grid pattern modulated by sub information and rotating each of the first, second and third color component information by a respective predetermined rotation angle, and then superposing the modulated color difference grid pattern on each of the first, second, and third color component information; and
   compositing the first, second, and third color component information superposed with the modulated color difference grid pattern to generate color image information.

6. A method according to claim 5, wherein the first color component information and the modulated color difference grid pattern are relatively rotated in a predetermined rotation direction through a first rotation angle, the second color component information and the modulated color difference grid pattern are relatively rotated in the predetermined rotation direction through a second rotation angle, the third color component information and the modulated color difference grid pattern are relatively rotated in the predetermined rotation direction through a third rotation angle, and the modulated color difference grid pattern is then superposed on each of the first color component information, the second color component information, and the third color component information, and the first color component information superposed with the color difference grid pattern is rotated in a direction opposite to the predetermined rotation direction through the first rotation angle, the second color component information superposed with the color difference grid pattern is rotated in the direction opposite to the predetermined rotation direction through the second rotation angle, the third color component information superposed with the color difference grid pattern is rotated in the direction opposite to the predetermined rotation direction through the third rotation angle, and the first, second and third color component information which are rotated in the opposite direction are composited.

7. An image processing apparatus processing color image information which is information generated by rotating a color difference grid pattern modulated by sub information and rotating each of first, second, and third color component information, which define main image information and correspond to at least three colors, by a respective predetermined rotation angle, and then superposing the modulated color difference grid pattern on each of the first, second, and third color component information, and compositing the first, second, and third color component information superposed with the modulated color difference grid pattern to generate color image information, the image processing apparatus comprising:

reading means for reading the color image information from a recorded material on which the color image information is recorded;

color separation means for separating the first, second, and third color component information from the color image information;

individual color rotation means for rotating the first, second, and third color component information by the respective predetermined rotation angles; and sub information extraction means for extracting the sub information from the rotated first, second, and third color component information based on the color difference grid pattern.

8. The apparatus according to claim 7, further comprising authenticity checking means for checking an authenticity of the recorded material based on the extraction result of the sub information.

9. An image processing method processing color image information which is information generated by rotating a color difference grid pattern modulated by sub information and rotating each of first, second, and third color component information, which define main image information and correspond to at least three colors, by a respective predetermined rotation angle, and then superposing the modulated color difference grid pattern on each of the first, second, and third color component information, and compositing the first, second, and third color component information superposed with the modulated color difference grid pattern to generate color image information, the image processing method comprising:

reading the color image information from a recorded material on which the color image information is recorded;

separating the first, second and third color component information from the color image information;

rotating the first, second, and third color component information by the respective predetermined rotation angles; and extracting the sub information from the rotated first, second, and third color component information based on the color difference grid pattern.

10. The method according to claim 9, further comprising checking an authenticity of the recorded material based on the extraction result of the sub information.

* * * * *